US012749313B1

(12) United States Patent
Broaddus et al.

(10) Patent No.: US 12,749,313 B1
(45) Date of Patent: Sep. 29, 2026

(54) SPARSE AGENT RE-IDENTIFICATION

(71) Applicant: Amazon Technologies, Inc., Seattle, WA (US)

(72) Inventors: Chris Broaddus, Sammamish, WA (US); Nikhil Chacko, Bothell, WA (US); Leonid Pishchulin, Seattle, WA (US); Robert Crandall, Lake Forest Park, WA (US); Xiaoqing Ge, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 266 days.

(21) Appl. No.: 18/614,385

(22) Filed: Mar. 22, 2024

(51) Int. Cl.

| | |
|---|---|
| ***G06V 20/52*** | (2022.01) |
| ***G06Q 30/04*** | (2012.01) |
| ***G06V 40/10*** | (2022.01) |
| ***G06V 40/20*** | (2022.01) |

(52) U.S. Cl.
CPC ............. *G06V 20/52* (2022.01); *G06Q 30/04* (2013.01); *G06V 40/10* (2022.01); *G06V 40/20* (2022.01)

(58) Field of Classification Search
CPC ........ G06V 20/52; G06V 40/10; G06V 40/20; G06Q 30/04
USPC .......................................................... 348/143
See application file for complete search history.

(56) References Cited

U.S. PATENT DOCUMENTS

| | | | |
|---|---|---|---|
| 6,185,314 B1 | 2/2001 | Crabtree et al. | |
| 6,263,088 B1 | 7/2001 | Crabtree et al. | |
| 6,654,047 B2 | 11/2003 | Iizaka | |
| 7,225,980 B2 | 6/2007 | Ku et al. | |

(Continued)

FOREIGN PATENT DOCUMENTS

| | | |
|---|---|---|
| CN | 102057371 A | 5/2011 |
| CN | 112712101 A | 4/2021 |

(Continued)

OTHER PUBLICATIONS

Abhaya Asthana et al., "An Indoor Wireless System for Personalized Shopping Assistance", Proceedings of IEEE Workshop on Mobile Computing Systems and Applications, 1994, pp. 69-74, Publisher: IEEE Computer Society Press.

(Continued)

*Primary Examiner* — Kathleen M Walsh
(74) *Attorney, Agent, or Firm* — Athorus, PLLC

(57) ABSTRACT

Disclosed are systems and methods for tracking and re-identification of agents through sparce and disparate event areas (entry, exit, inventory locations, etc.) within a materials handling facility that includes untracked areas. With the disclosed implementations, only certain areas of a materials handling facility need cameras while other areas may be devoid of cameras. With the disclosed implementations, re-identification of an agent may only occur when the agent enters an authentication event area, such as an exit event area and/or performs a defined action, such as an item pick from an inventory location or an item place to an inventory location. In other instances, while an agent may be tracked (Continued)

while the agent is located within an event area, the tracklet generated for that agent while in that event area may remain unlinked or otherwise disconnected from any other tracklet until re-identification of the agent is performed (e.g., when the agent exits the materials handling facility).

20 Claims, 25 Drawing Sheets

(56) References Cited

U.S. PATENT DOCUMENTS

| | | | | |
|---|---|---|---|---|
| 7,949,568 | B2 | 5/2011 | Fano et al. | |
| 8,009,864 | B2 | 8/2011 | Linaker et al. | |
| 8,175,925 | B1 | 5/2012 | Rouaix | |
| 8,189,855 | B2 | 5/2012 | Opalach et al. | |
| 8,423,431 | B1 | 4/2013 | Rouaix et al. | |
| 8,630,924 | B2 | 1/2014 | Groenevelt et al. | |
| 8,688,598 | B1 | 4/2014 | Shakes et al. | |
| 9,473,747 | B2 | 10/2016 | Kobres et al. | |
| 9,805,264 | B2 | 10/2017 | Kuznetsova et al. | |
| 10,055,853 | B1 | 8/2018 | Fisher et al. | |
| 10,134,004 | B1 | 11/2018 | Liberato, Jr. et al. | |
| 10,388,019 | B1 | 8/2019 | Hua et al. | |
| 10,438,277 | B1 | 10/2019 | Jiang et al. | |
| 10,467,461 | B2 | 11/2019 | Ikeda et al. | |
| 10,552,750 | B1 | 2/2020 | Raghavan et al. | |
| 10,586,203 | B1 | 3/2020 | Maldonado et al. | |
| 10,592,742 | B1 | 3/2020 | Hua et al. | |
| 10,789,720 | B1 | 9/2020 | Mirza et al. | |
| 10,891,736 | B1 | 1/2021 | Hua | |
| 11,328,513 | B1 | 5/2022 | Osherovich et al. | |
| 11,386,306 | B1 | 7/2022 | Siddiquie et al. | |
| 12,275,431 | B1 * | 4/2025 | Kobilarov | B60W 30/09 |
| 2003/0002712 | A1 | 1/2003 | Steenburgh et al. | |
| 2004/0153671 | A1 | 8/2004 | Schuyler et al. | |
| 2004/0181467 | A1 | 9/2004 | Raiyani et al. | |
| 2004/0228503 | A1 | 11/2004 | Cutler | |
| 2005/0237196 | A1 | 10/2005 | Matsukawa et al. | |
| 2006/0083423 | A1 | 4/2006 | Brown et al. | |
| 2007/0188324 | A1 | 8/2007 | Ballin et al. | |
| 2007/0211938 | A1 | 9/2007 | Tu et al. | |
| 2007/0217676 | A1 | 9/2007 | Grauman et al. | |
| 2008/0055087 | A1 | 3/2008 | Horii et al. | |
| 2008/0077511 | A1 | 3/2008 | Zimmerman | |
| 2008/0109114 | A1 | 5/2008 | Orita et al. | |
| 2009/0010490 | A1 | 1/2009 | Wang et al. | |
| 2009/0052739 | A1 | 2/2009 | Takahashi et al. | |
| 2009/0121017 | A1 | 5/2009 | Cato et al. | |
| 2009/0129631 | A1 | 5/2009 | Faure et al. | |
| 2009/0245573 | A1 | 10/2009 | Saptharishi et al. | |
| 2009/0304229 | A1 | 12/2009 | Hampapur et al. | |
| 2009/0324020 | A1 | 12/2009 | Hasebe et al. | |
| 2010/0266159 | A1 | 10/2010 | Ueki et al. | |
| 2011/0011936 | A1 | 1/2011 | Morandi et al. | |
| 2011/0080336 | A1 | 4/2011 | Leyvand et al. | |
| 2011/0085705 | A1 | 4/2011 | Izadi et al. | |
| 2011/0085739 | A1 | 4/2011 | Zhang et al. | |
| 2012/0020518 | A1 | 1/2012 | Taguchi | |
| 2012/0026335 | A1 | 2/2012 | Brown et al. | |
| 2012/0093364 | A1 | 4/2012 | Sato | |
| 2012/0170804 | A1 | 7/2012 | Lin et al. | |
| 2012/0281878 | A1 | 11/2012 | Matsuda et al. | |
| 2012/0284132 | A1 | 11/2012 | Kim et al. | |
| 2012/0307051 | A1 | 12/2012 | Welter | |
| 2013/0076898 | A1 | 3/2013 | Philippe et al. | |
| 2013/0182114 | A1 | 7/2013 | Zhang et al. | |
| 2013/0182905 | A1 | 7/2013 | Myers et al. | |
| 2013/0184887 | A1 | 7/2013 | Ainsley et al. | |
| 2013/0253700 | A1 | 9/2013 | Carson et al. | |
| 2014/0050352 | A1 | 2/2014 | Buehler et al. | |
| 2014/0072170 | A1 | 3/2014 | Zhang et al. | |
| 2014/0072174 | A1 | 3/2014 | Wedge | |
| 2014/0107842 | A1 | 4/2014 | Yoon et al. | |
| 2014/0253706 | A1 | 9/2014 | Noone et al. | |
| 2014/0279294 | A1 | 9/2014 | Field-Darragh et al. | |
| 2014/0328512 | A1 | 11/2014 | Gurwicz et al. | |
| 2014/0355825 | A1 | 12/2014 | Kim et al. | |
| 2014/0362223 | A1 | 12/2014 | LaCroix et al. | |
| 2015/0012396 | A1 | 1/2015 | Puerini et al. | |
| 2015/0019391 | A1 | 1/2015 | Kumar et al. | |
| 2015/0073907 | A1 | 3/2015 | Purves et al. | |
| 2015/0127485 | A1 | 5/2015 | Kakizawa et al. | |
| 2015/0146921 | A1 | 5/2015 | Ono et al. | |
| 2015/0213328 | A1 | 7/2015 | Mase | |
| 2015/0262365 | A1 | 9/2015 | Shimizu | |
| 2015/0294183 | A1 | 10/2015 | Watanabe et al. | |
| 2015/0345942 | A1 | 12/2015 | Allocco et al. | |
| 2016/0110613 | A1 | 4/2016 | Ghanem et al. | |
| 2016/0217326 | A1 | 7/2016 | Hosoi | |
| 2017/0193772 | A1 | 7/2017 | Kusens et al. | |
| 2017/0278254 | A1 | 9/2017 | Ikeda et al. | |
| 2017/0308919 | A1 | 10/2017 | Karuvath et al. | |
| 2017/0372487 | A1 | 12/2017 | Lagun et al. | |
| 2018/0068172 | A1 | 3/2018 | Despiegel et al. | |
| 2018/0096209 | A1 | 4/2018 | Matsuda et al. | |
| 2018/0107880 | A1 | 4/2018 | Danielsson et al. | |
| 2018/0189271 | A1 | 7/2018 | Noh et al. | |
| 2018/0247112 | A1 | 8/2018 | Norimatsu | |
| 2018/0267996 | A1 | 9/2018 | Lin et al. | |
| 2018/0373928 | A1 | 12/2018 | Glaser et al. | |
| 2019/0019016 | A1 | 1/2019 | Ikeda et al. | |
| 2019/0033447 | A1 | 1/2019 | Chan et al. | |
| 2019/0050629 | A1 | 2/2019 | Olgiati | |
| 2019/0065895 | A1 | 2/2019 | Wang et al. | |
| 2019/0104283 | A1 | 4/2019 | Wakeyama et al. | |
| 2019/0130718 | A1 | 5/2019 | Alpert | |
| 2019/0139229 | A1 | 5/2019 | Ohira et al. | |
| 2019/0147251 | A1 | 5/2019 | Numata | |
| 2019/0156106 | A1 | 5/2019 | Schroff et al. | |
| 2019/0205965 | A1 | 7/2019 | Li et al. | |
| 2019/0325342 | A1 | 10/2019 | Sikka et al. | |
| 2019/0347523 | A1 | 11/2019 | Rothberg et al. | |
| 2020/0005615 | A1 | 1/2020 | Madden et al. | |
| 2020/0184515 | A1 | 6/2020 | deWet et al. | |
| 2020/0193166 | A1 | 6/2020 | Russo et al. | |
| 2020/0302186 | A1 * | 9/2020 | Yang | G06V 40/103 |
| 2020/0410572 | A1 | 12/2020 | Higa et al. | |
| 2021/0019528 | A1 * | 1/2021 | Ghadyali | G06T 7/246 |
| 2021/0027608 | A1 | 1/2021 | Shakedd et al. | |
| 2021/0125344 | A1 * | 4/2021 | Zhang | G06V 20/10 |
| 2024/0329210 | A1 * | 10/2024 | Joseph | G01S 17/89 |

FOREIGN PATENT DOCUMENTS

| | | | |
|---|---|---|---|
| CN | 116049454 | A | 5/2023 |
| EP | 3333771 | A1 | 6/2018 |
| WO | 2019079907 | A1 | 5/2019 |

OTHER PUBLICATIONS

Cristian Pop, "Introduction to the BodyCom Technology", Microchip AN1391, May 2, 2011, pp. 1-24, vol. AN1391, No. DS01391A, Publisher: 2011 Microchip Technology Inc.

Schroff, F., et al., "FaceNet: A Unified Embedding for Face Recognition and Clustering"; Proceedings of the IEEE Conference on Computer Vision and Pattern Recognition (CVPR), 2015, pp. 815-823.

* cited by examiner

SPARSE AGENT RE-IDENTIFICATION

BACKGROUND

Today, imaging devices such as digital cameras are frequently used for monitoring operations. For example, digital cameras are often used to monitor the arrivals or departures of goods or the performance of services in materials handling facilities such as warehouses, fulfillment centers, retail establishments, or other like facilities. Digital cameras are also used to monitor the travels of persons or objects in locations such as airports, stadiums or other dense environments, or the flow of traffic on one or more sidewalks, roadways or highways. Additionally, digital cameras are commonplace in financial settings such as banks and casinos, where money changes hands in large amounts or at high rates of speed.

A plurality of digital cameras (or other imaging devices) may be provided in a network, and aligned and configured to capture imaging data such as still or moving images of actions or events occurring within their respective fields of view. The digital cameras may include one or more sensors, processors and/or memory components or other data stores. Information regarding the imaging data or the actions or events depicted therein may be subjected to further analysis by one or more of the processors operating on the digital cameras to identify aspects, elements or features of the content expressed therein.

DETAILED DESCRIPTION

Figure 1A:
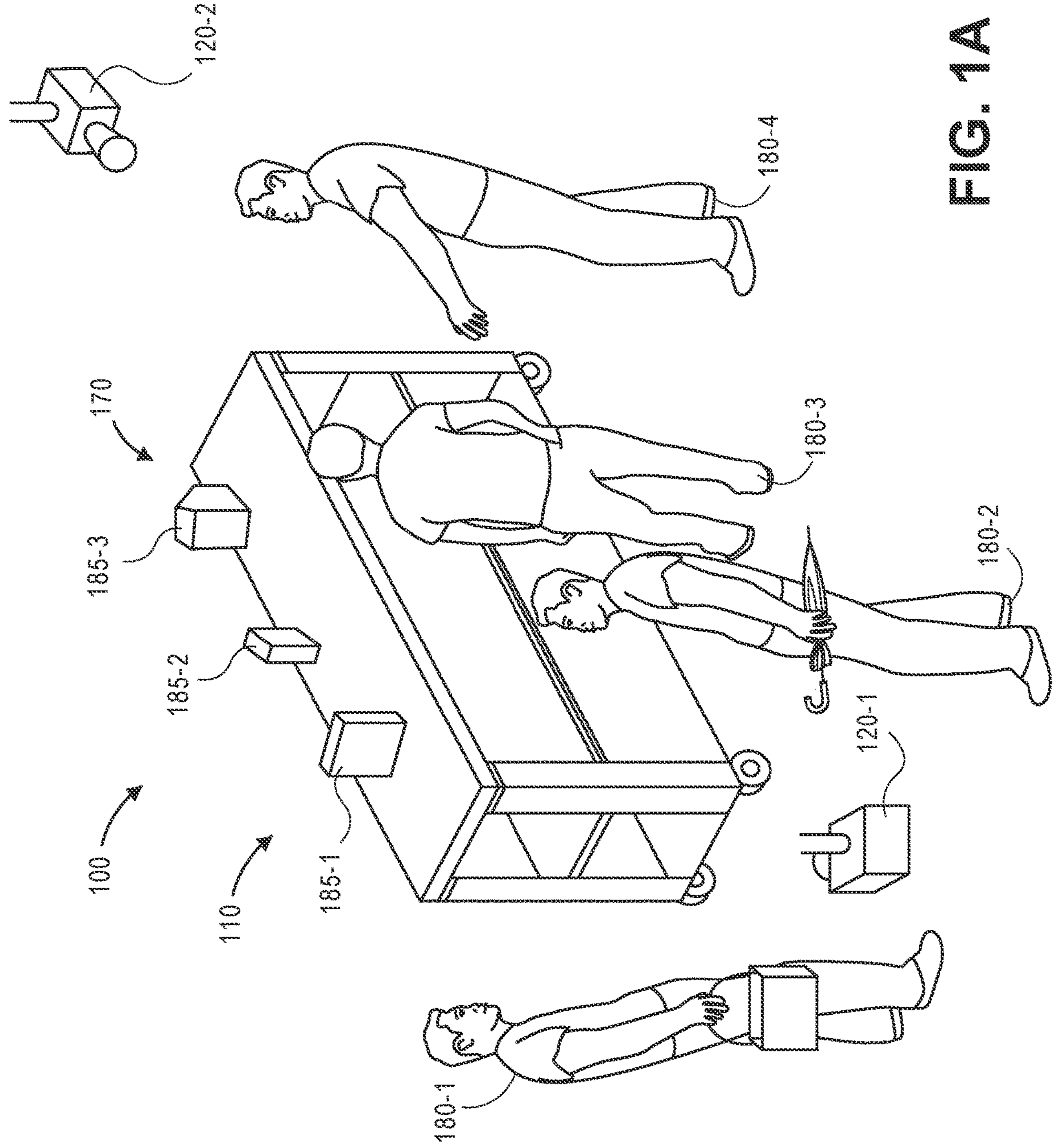
FIGS. 1A through IL are views of aspects of one system for sparse re-identification of an agent using digital imagery and machine learning, in accordance with implementations of the present disclosure.

As is set forth in greater detail below, the present disclosure is directed to processing digital imagery captured from one or more fields of view of cameras from different and separated event areas within a materials handling facility for use in re-identifying an agent at an authentication event area of the materials handling facility, such as an entry event area or an exit event area. In contrast to existing systems that have full camera coverage of the materials handling facility so that an agent can be tracked as the agent moves through the materials handling facility and/or quickly be re-identified if tracking is lost, with the disclosed implementations, only event areas, such as inventory locations, entries, exits, etc., may include cameras or other imaging elements and the tracking of the agent as the agent moves between event areas within the materials handling facility may be unknown. Still further, with the disclosed implementations, re-identification of the agent may only occur when the agent enters a defined event area, such as an exit event area and/or performs a defined action, such as an item pick from an inventory location or an item place to an inventory location. In other instances, while an agent may be tracked while the agent is located within an event area, the tracklet generated for that agent while in that event area, referred to herein as a sub-session tracklet, may be unlinked or otherwise disconnected from any other sub-session tracklet and/or the agent until re-identification of the agent is performed (e.g., when the agent exits the materials handling facility).

The disclosed implementations provide a technical improvement over existing systems by reducing the computing cost to process images of the agent and continually monitor or track the position of an agent within the materials handling facility. Still further, the cost and complexity of installing a system of cameras and computing infrastructure within a materials handling facility is greatly reduced as entire areas of the materials handling facility, such as hallways, rest areas, and other non-event areas within the materials handling facility do not need cameras or other imaging elements. Yet, with the disclosed implementations, the position of the agent when the agent is performing tracked actions and the actions performed by the agent may be accurately maintained.

An entry event area, as used herein, is any position, location or area within or near a materials handling facility through which an agent may enter the materials handling facility or enter a designated section of a materials handling facility (such as a secure or separate room within a materials handling facility). An exit event area, as used herein, is any position, location or area within or near a materials handling facility through which an agent may exit the materials handling facility or exit a designated section of a materials handling facility (such as a secure or separate room within a materials handling facility). Other event areas may include any other area within a materials handling facility at which one or more cameras are positioned to generate image data of an agent, and/or the agent performing an action, such as an item pick of an item from an inventory location or an item place of an item to an inventory location. An "agent," as used herein may include, but is not limited to, users, workers, customers, and/or other human, animal, and/or robotic personnel or entities.

As discussed herein, the disclosed implementations may include imaging devices (e.g., digital cameras), also referred to herein generally as cameras, configured to capture imaging data and to processing of the imaging data using one or more machine learning systems or techniques operating on the imaging devices, or on one or more external devices or systems. The imaging devices may provide imaging data (e.g., images or image frames) as inputs to the machine learning systems or techniques, and determine, for one or more segments of the imaging data, a feature set that includes one or more embedding vectors representative of the segment of the imaging data. As an agent moves into an event area within the materials handling facility, a tracklet may be generated for the agent and a sub-session tracklet of the agent maintained while the agent is within the materials handling facility. The sub-session tracklet may include an entry and exit time indicating the times at which the agent entered the event area and exited the event area, the location of the event area within the materials handling facility, and a feature set of embedding vectors generated for the agent while the agent was in the event area, and/or a feature embedding representative of the feature set of embedding vectors.

Sub-session tracklets for each agent detected and tracked in each event area may be maintained in a list of unlinked sub-session tracklets for the materials handling facility. When an agent is detected in an exit event area, an exit tracklet with a corresponding feature set/feature embedding may be generated and compared to candidate sub-session tracklets to determine which of the candidate sub-session tracklets correspond to the agent at the exit event area. Each matching sub-session tracklet and any corresponding actions (e.g., item pick, item place) may be associated with the agent and optionally the agent charged for any items that were determined to be picked and associated with the agent.

As one example, an agent, Agent 1, has entered an exit event area and all unlinked sub-session tracklets corresponding to that agent are to be re-identified. Upon determining that Agent 1 at the exit event area is to be re-identified, one or more images of Agent 1 are obtained and processed to generate embedding vector(s) of Agent 1 at the exit event area. Likewise, a candidate set of unlinked sub-session tracklets, which include corresponding feature sets of embedding vectors determined for the agent tracked during the respective sub-session are also determined (or a feature embedding indicative of the feature set), in this example, tracklet A, tracklet B, and tracklet C, each corresponding to an agent detected in different event areas within the materials handling facility. Embedding vector(s) of each of tracklet A, tracklet B, and tracklet C are generated or obtained and compared with the embedding vector(s) of Agent 1. For example, using a machine learning system, the embedding vector(s) for Agent 1 are compared with the embedding vector(s) for tracklet A to produce a first similarity score; the embedding vector(s) for Agent 1 are compared with the embedding vector(s) for tracklet B to produce a second similarity score; and the embedding vector(s) for Agent 1 are compared with the embedding vector(s) for tracklet C to produce a third similarity score. It is then determined whether the similarity scores exceed a similarity threshold indicative of whether the embedding vectors are representative of the same agent. In this example it is determined that both tracklet A and tracklet B have similarity scores that exceed the similarity threshold but that tracklet C does not have a similarity score that exceeds the threshold. The tracklet(s) with similarity scores exceeding the threshold, in this example tracklet A and tracklet B, are determined to be the agent to be re-identified and the tracklets, along with the corresponding positions and any events performed by the agent corresponding to the tracklets, are associated with Agent 1.

While the above examples and other examples discussed herein refer to determining a similarity score between embedding vectors and/or determining if the similarity score exceeds a threshold, it will be appreciated that the similarity score may be a distance determined between embedding vectors projected into a multidimensional embedding space such that embedding vectors that are closer in distance (i.e., more similar) receive a higher score and embedding vectors that are farther apart in distance receive a lower similarity score. In such examples, the threshold may be a maximum distance or minimum distance. Likewise, the disclosed implementations may process feature embeddings that are indicative of feature sets to determine similarity scores.

Figure 1B:
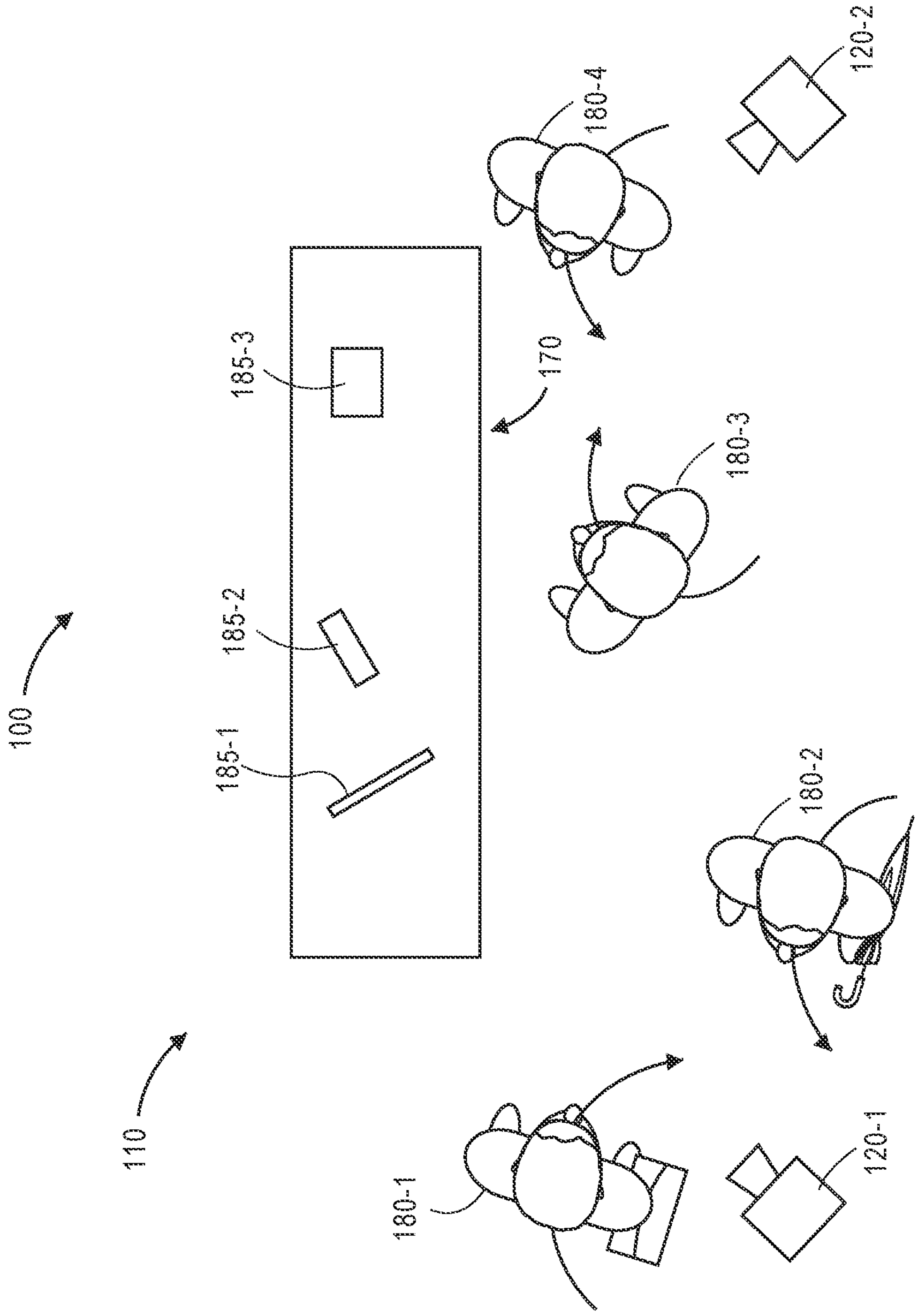

Referring to FIGS. 1A through 1L, views of aspects of one system 100 for re-identification of agents while in an event area of a materials handling facility using digital imagery and machine learning in accordance with implementations of the present disclosure are shown. As is shown in FIGS. 1A and 1B, the system 100 includes an event area 110, such as an inventory location, entry area, exit area, etc., within a materials handling facility, a fulfillment center, a warehouse, or any other like facility. The event area 110 includes one or more imaging devices 120-1, 120-2 (e.g., digital cameras), and may include other things, such as a storage unit 170 (e.g., a set of inventory shelves), doors, and/or items 185-1, 185-2, 185-3.

As is shown in FIGS. 1A and 1B, the imaging devices 120-1, 120-2 are aligned with fields of view that overlap at least in part over a portion of the event area 110, and are configured to generate imaging data, such as still or moving images, from the event area 110. The imaging devices 120-1, 120-2 may be installed or otherwise operated independently or as components of an imaging device network (or camera network), and may be in communication with one or more computer devices or systems, e.g., over one or more computer networks. In some implementations, the imaging devices 120-1, 120-2 may be part of an inventory shelf, inventory cabinet, etc., such that some or all of the event area is modular.

The event area 110 may be any open or enclosed environment or space in which any number of agents (e.g., humans, other animals or machines) may be present or pass through the field of view of one or more of the imaging devices 120-1, 120-2, such as agents 180-1, 180-2, 180-3, 180-4 as shown in FIG. 1A. For example, as is shown in FIG. 1B, the agents 180-1, 180-2, 180-3, 180-4 are in motion within a vicinity of the shelving unit 170, and each is partially or entirely within the fields of view of the imaging devices 120-1, 120-2. The locations/positions and/or motion of the agents 180-1, 180-2, 180-3, 180-4 may be detected and tracked, such that a trajectory, or "tracklet," representative of locations/positions or motion of one or more agents 180-1, 180-2, 180-3, 180-4 while in the event area 110 may be generated based on the presence of such agents within images captured by a single imaging device, e.g., from a common field of view, or within images captured by multiple imaging devices. The trajectories may be generated over a predetermined number or series of frames (e.g., tens of frames or more), subject to any compatibility or incompatibility parameters or constraints.

Figure 1C:
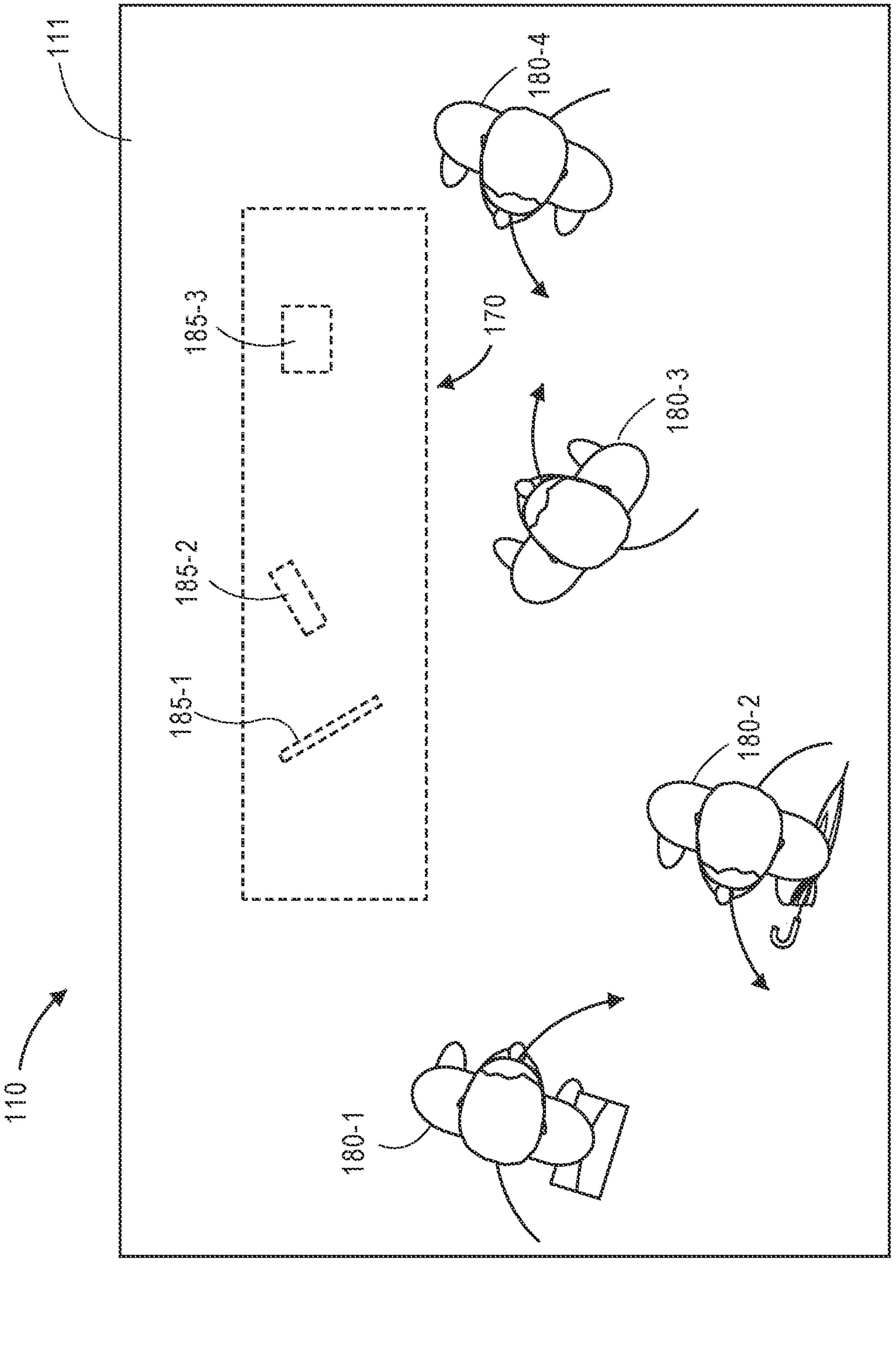
Figure 1D:
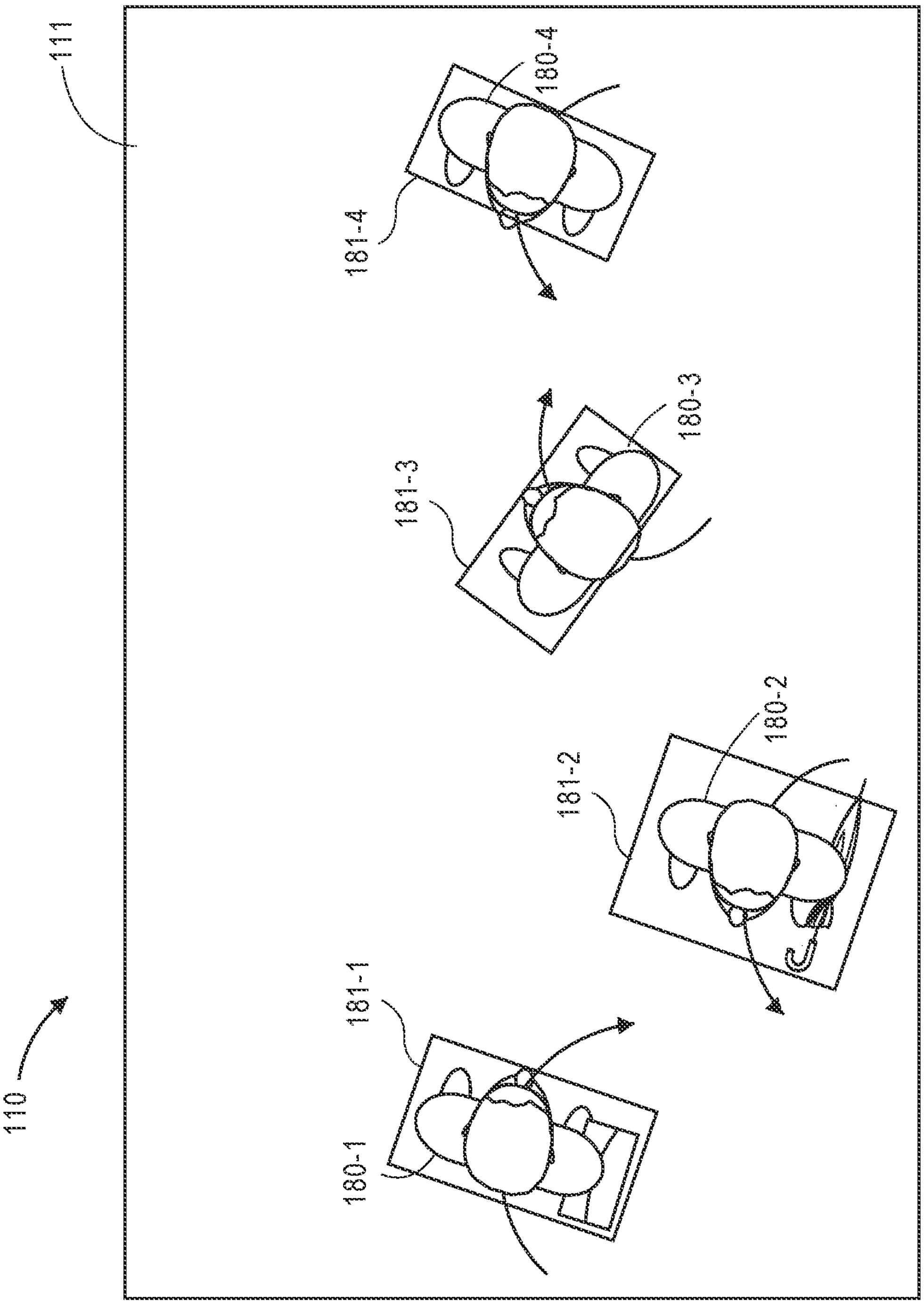

In some implementations, an image may be processed and/or segmented prior to submission of a portion of the image to a machine learning system. For example, an image may be processed using one or both of foreground segmentation or background segmentation to aid in distinguishing agents 180 from background objects of the scene 110. For example, FIG. 1C illustrates an overhead view of the event area 110 obtained by an overhead imaging device, such as a digital still camera. The digital image 111 of the event area 110 is processed using one or both of foreground segmentation and/or background segmentation to distinguish foreground objects, in this example agents 180-1, 180-2, 180-3, and 180-4 from background objects 170, 185-1, 185-2, and 185-3, illustrated now by dashed lines. In some implementations, a background image representation of the event area when there are no foreground objects present may be maintained in a data store and compared with the current image of the event area 110 to subtract out objects present in both images, leaving only foreground objects. In other implementations, other techniques or algorithms that are known to those skilled in the art may be used to perform foreground and/or background segmentation of the image.

In addition to performing foreground and/or background segmentation, in some implementations, additional processing of the segmented image may be performed to further segment out each agent represented in the image. For example, an object detection algorithm, such as You Only Look Once (YOLO), may be used to process the image, a series of images, the segmented image, or a series of segmented images to detect each object, in this example the agents represented in the event area, and a bounding box, such as a rectangle, may be positioned around each agent to encompass the detected agent. For example, referring to FIG. 1D, an object detection algorithm has further processed the segmented image 111 of the event area to detect agents 180-1, 180-2, 180-3, and 180-4 and bounding boxes 181-1, 181-2, 181-3, and 181-4 are positioned around each detected agent 180 to encompass or define the pixels of the image 111 that correspond to or represent each agent. As discussed in further detail below, the pixels of the image data within each bounding box may be independently processed by a machine learning system to produce an embedding vector representative of each agent. Likewise, as discussed below, sets of feature vectors may be processed by a transformer to generate a feature embedding indicative of a set of feature vectors.

While this example describes both foreground and/or background subtraction and image segmentation using object detection to detect and extract portions of the image representative of agents, in some implementations foreground and/or background subtraction may be omitted and images may be processed to identify and extract pixels representative of agents using only segmentation, such as an object detection algorithm.

Figure 1E:
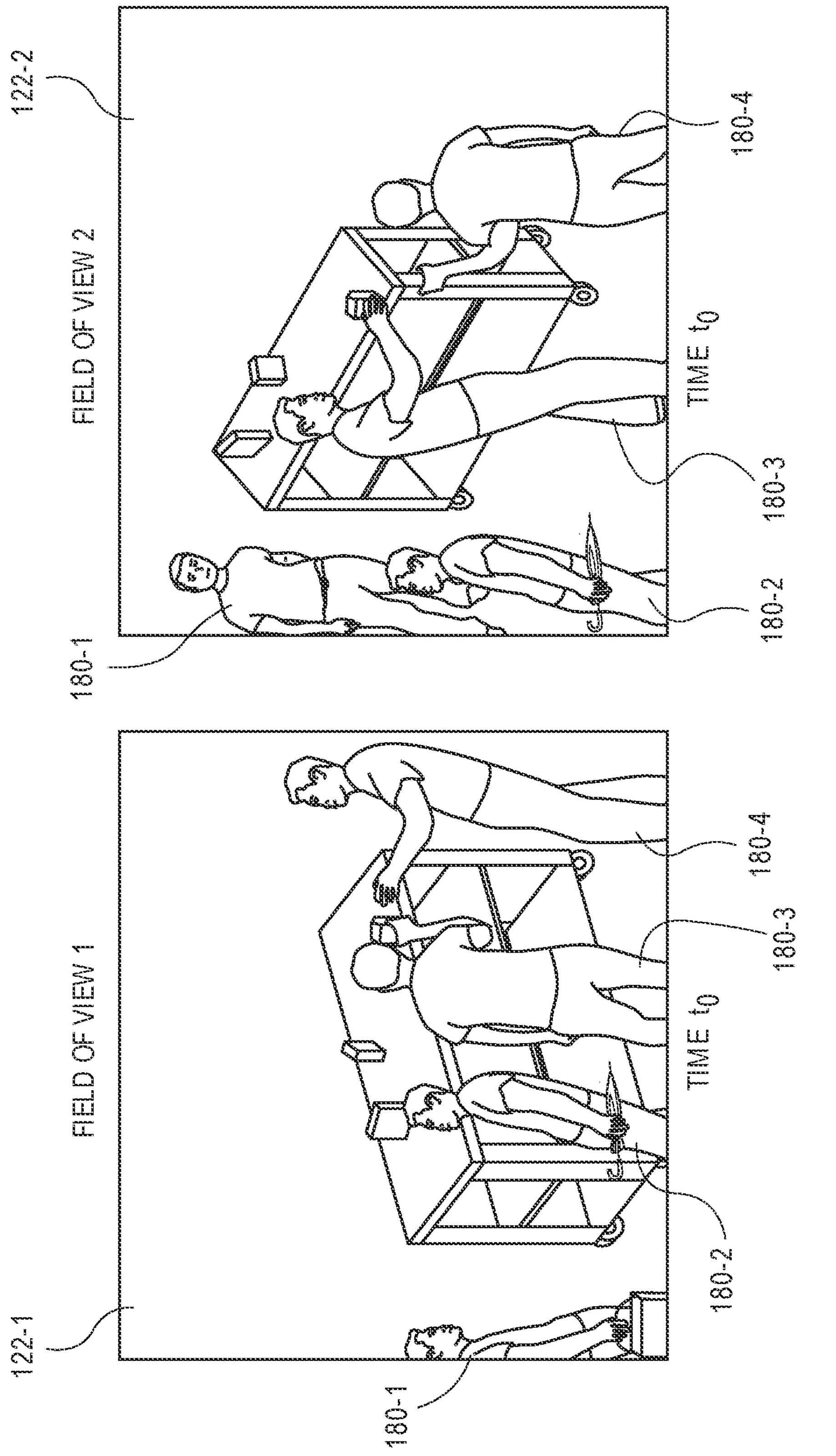

In some implementations, multiple fields of view of an event area may be processed as discussed above and utilized together to re-identify agents in the event area. For example, FIG. 1E illustrates digital images of two fields of view 122-1 and 122-2 of the event area 110 at time to obtained by imaging devices 120-1, 120-2. The digital images may be processed to segment out the agents 180-1, 180-2, 180-3, and 180-4 so that the segmented out agents can be efficiently processed by machine learning systems to re-identify one or more of those agents and/or generate a feature set of embedding vectors for the agent and/or a feature embedding for the agent. The images 122-1, 122-2 depict the positions of the respective agents 180-1, 180-2, 180-3, 180-4 within the fields of view of the imaging devices 120-1, 120-2 at the time to. Moreover, the digital images 122-1, 122-2 may include visual images, depth images, or visual images and depth images.

Figure 1F:
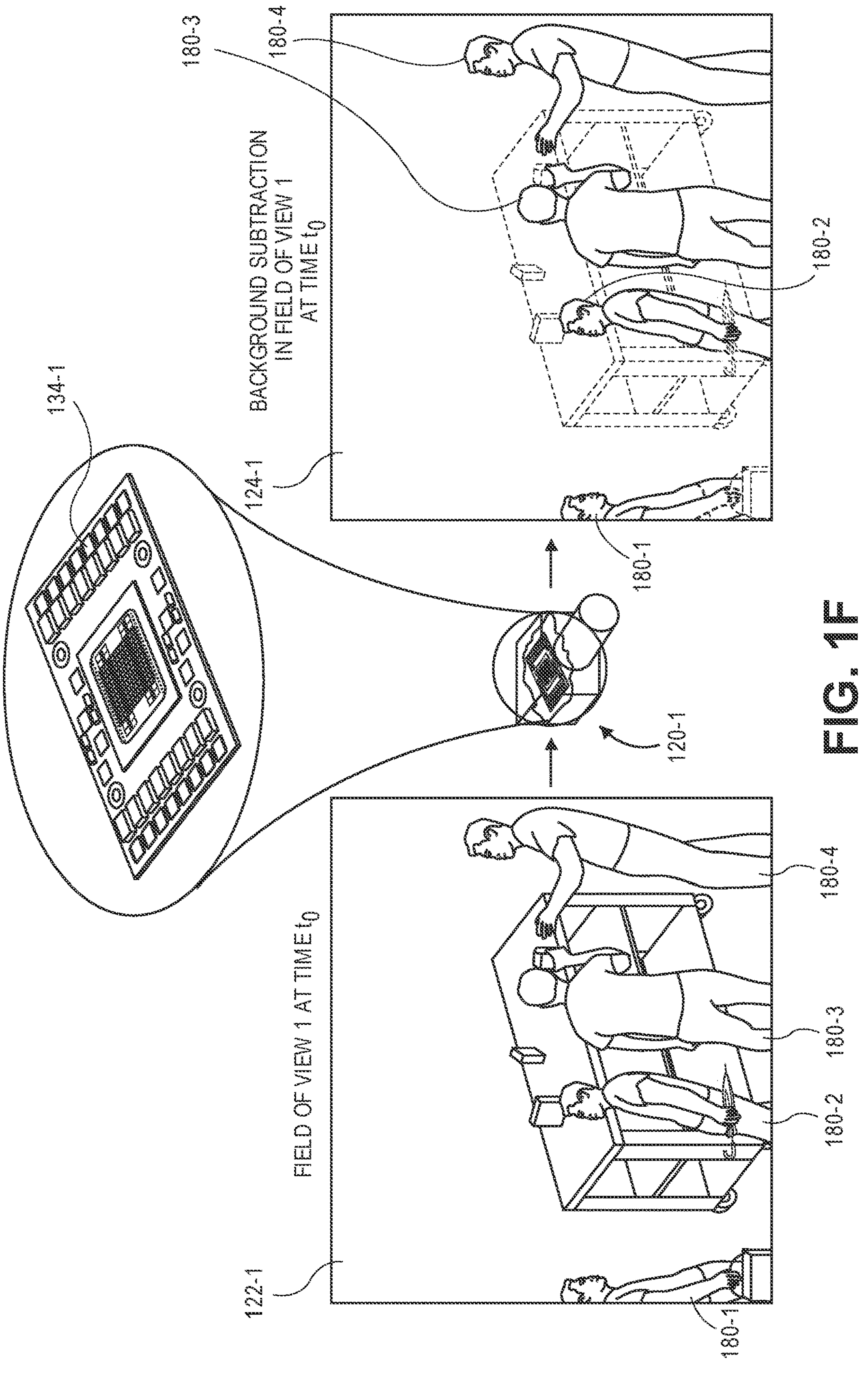
Figure 1G:
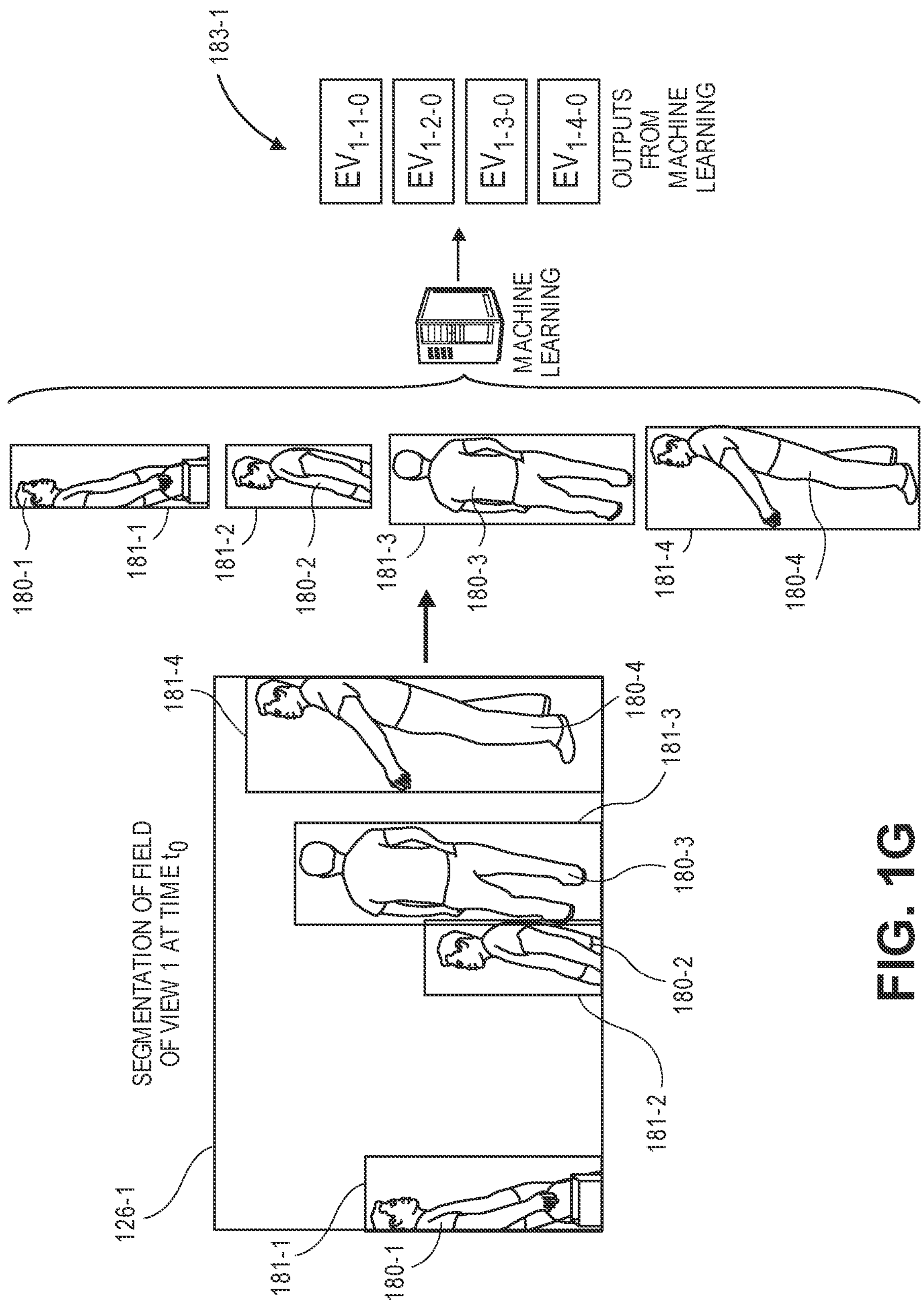

In some implementations of the present disclosure, imaging devices may be programmed to execute one or more machine learning systems or techniques that are trained to generate a feature set of embedding vectors for an agent represented in an event area and/or a feature embedding for the agent. For example, as is shown in FIG. 1F, a processor unit 134-1 operating on the imaging device 120-1 may receive the image 122-1 captured by the imaging device 120-1 at the time to (or substantially at the time to), and perform background/foreground processing to produce a foreground record 124-1 that includes the agents 180-1, 180-2, 180-3, 180-4 that are depicted within the image 122-1. Additionally, as illustrated in FIG. 1G, the processor unit 134-1 may further segment the image using an object detection algorithm, such as YOLO, to detect the agents 180-1, 180-2, 180-3, and 180-4 and define bounding boxes 181-1, 181-2, 181-3, and 181-4 around those agents thereby defining the segments of the record 126-1 representative of each agent. Finally, the processor unit 134-1 may independently process the portion of the digital image contained within each bounding box 181 to produce embedding vectors 183-1 representative of each agent 180-1, 180-2, 180-3, and 180-4. In this example, processing of the segment of the digital image contained within bounding box 181-1 produces embedding vector $EV_{1-1-0}$, processing of the segment of the digital image contained within bounding box 181-2 produces embedding vector $EV_{1-2-0}$, processing of the segment of the digital image contained within bounding box 181-3 produces embedding vector $EV_{1-3-0}$, and processing of the segment of the digital image contained within bounding box 181-4 produces embedding vector $EV_{1-4-0}$. The machine learning systems or techniques may be any type or form of tool that is trained to produce embedding vectors representative of agents. In some implementations, a processor unit provided on an imaging device may be programmed to execute a fully convolutional network (e.g., a residual network, such as a deep residual learning network) on inputs including images captured thereby. Alternatively, the one or more machine learning systems or techniques that are trained to detect agents may be executed by one or more computer devices or machines in other locations, e.g., alternate or virtual locations, such as in a "cloud"-based environment. For example, the background/foreground subtraction of the image data and the segmentation of the image data with bounding boxes may be performed by the imaging device. The additional processing to produce embedding vectors 183-1 using machine learning systems or techniques may be executed by one or more computing devices or machines that are separate from the imaging devices.

The resultant embedding vectors are associated with each agent 180, or tracklet corresponding to each agent and used when and if needed for re-identification of the agent, as discussed further below. An embedding vector, as used herein, is produced from a machine learning and/or deep network and is a vector representation of an object, such as an agent. For example, an embedding vector may include continuous data, such as a series of floating point numbers indicative of object attributes of the object. Object attributes include anything about the object, including, but not limited to, color, size, shape, texture, etc.

Figure 1H:
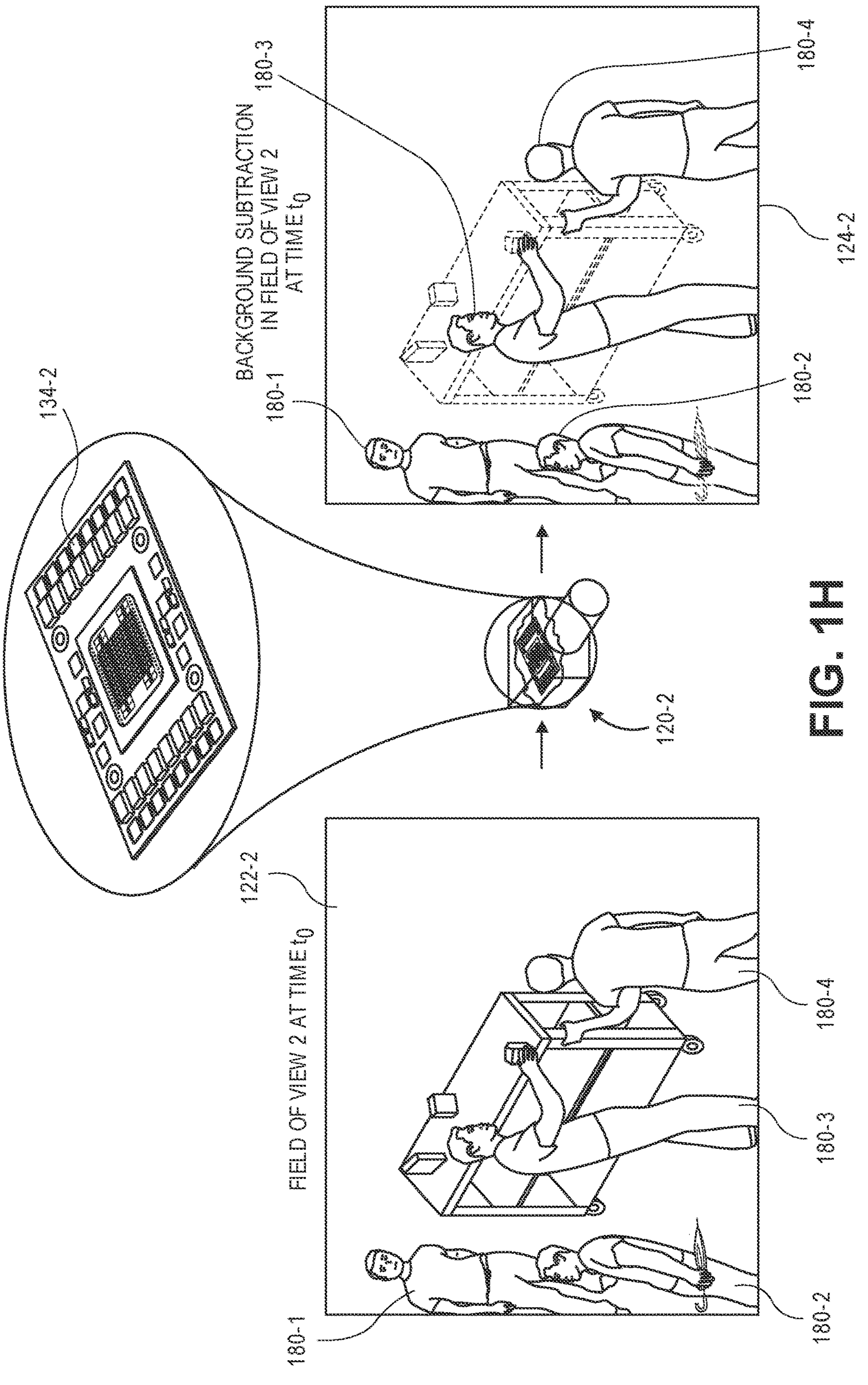
Figure 1I:
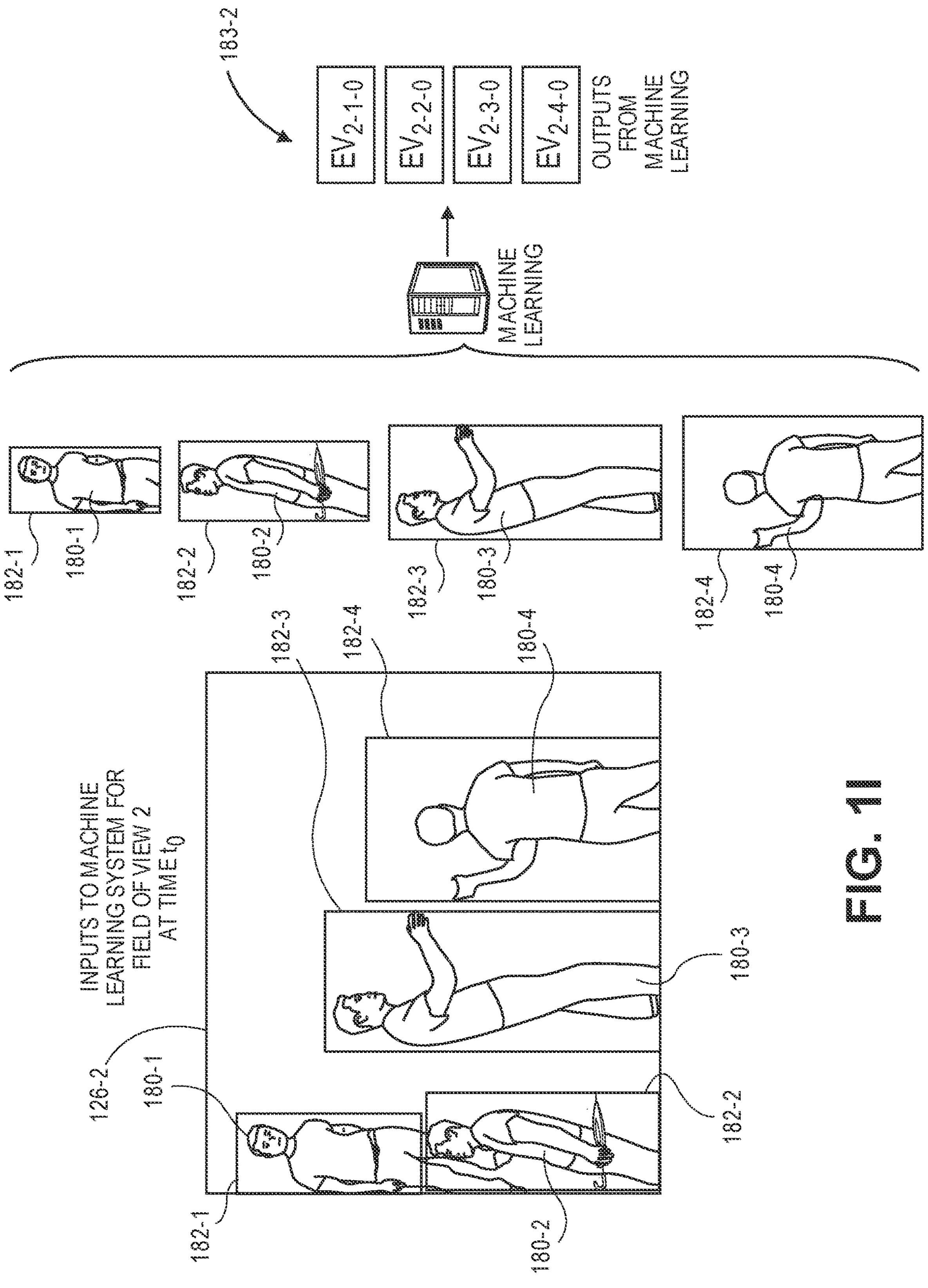

Likewise, as is shown in FIG. 1H, a processor unit 134-2 operating on the imaging device 120-2 may receive the image 122-2 captured by the imaging device 120-2 at the time to, and perform background/foreground processing to produce a foreground record 124-2 that includes the agents 180-1, 180-2, 180-3, 180-4 that are depicted within the image 122-2. Additionally, as illustrated in FIG. 1I, the processor unit 134-2 may further segment the image using an object detection algorithm, such as YOLO, to detect the agents 180-1, 180-2, 180-3, and 180-4 and define bounding boxes 182-1, 182-2, 182-3, and 182-4 around those agents thereby defining the segments of the record 126-2 representative of each agent. Finally, the processor unit 134-2 may independently process the portion of the digital image contained within each bounding box 182 to produce embedding vectors 183-2 representative of each agent 180-1, 180-2, 180-3, and 180-4. In this example, processing of the segment of the digital image contained within bounding box 182-1 produces embedding vector $EV_{2-1-0}$, processing of the segment of the digital image contained within bounding box 182-2 produces embedding vector $EV_{2-2-0}$, processing of the segment of the digital image contained within bounding box 182-3 produces embedding vector $EV_{2-3-0}$, and processing of the segment of the digital image contained within bounding box 182-4 produces embedding vector $EV_{2-4-0}$. As discussed above, the machine learning systems or techniques may be any type or form of tool that is trained to produce embedding vectors representative of agents. In some implementations, a processor unit provided on an imaging device may be programmed to execute a fully convolutional network (e.g., a residual network, such as a deep residual learning network) on inputs including images captured thereby. Alternatively, the one or more machine learning systems or techniques that are trained to detect agents may be executed by one or more computer devices or machines in other locations, e.g., alternate or virtual locations, such as in a "cloud"-based environment. As illustrated in FIG. 1I, the background/foreground subtraction of the image data and the segmentation of the image data with bounding boxes may be performed by the imaging device and the additional processing to produce embedding vectors 183-2 using machine learning systems or techniques may be executed by one or more computing devices or machines that are separate from the imaging devices.

Figure 1J:
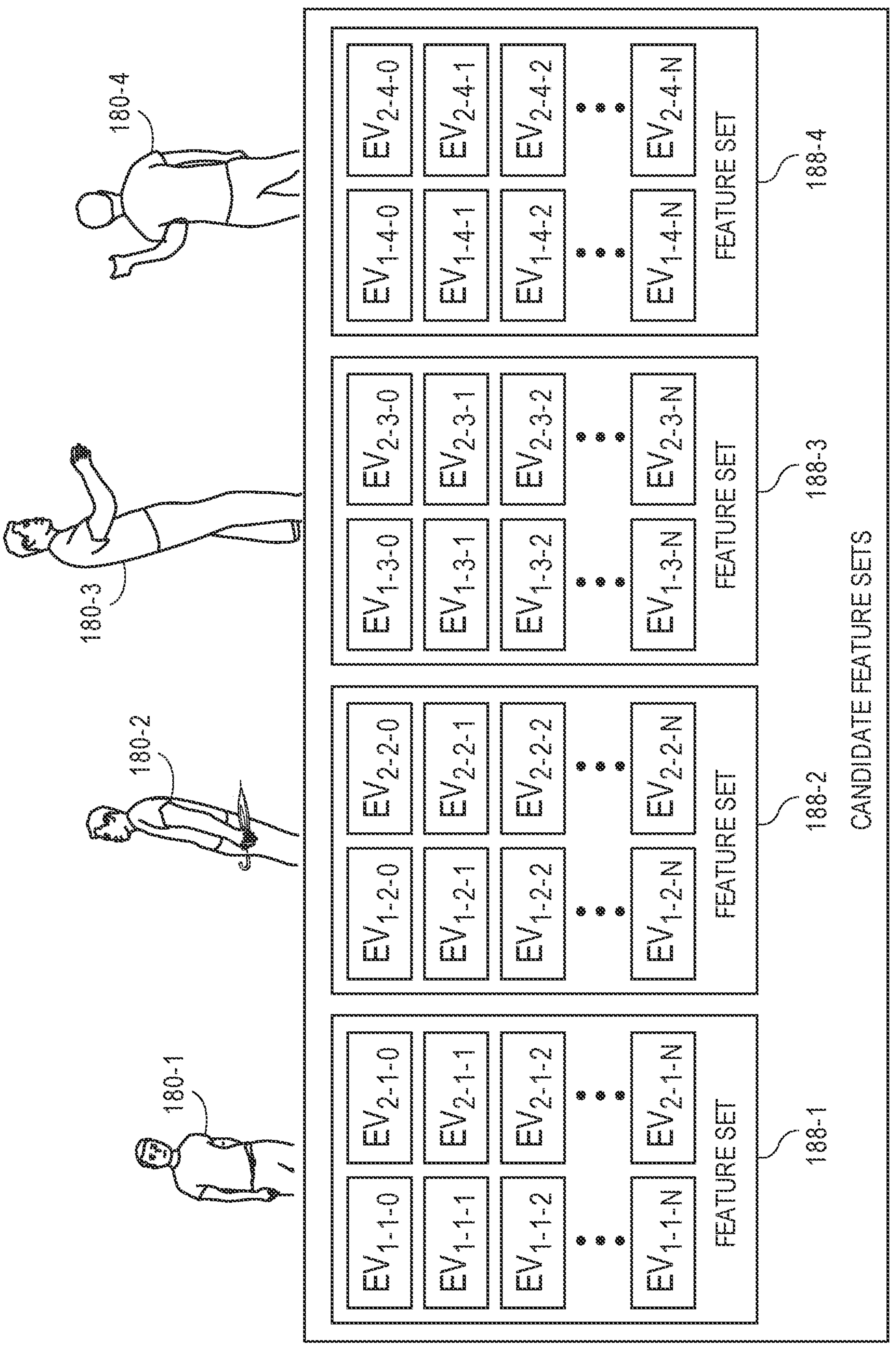

As illustrated in FIG. 1J, the resultant embedding vectors 183-1, 183-2 are associated with each agent 180, or tracklet corresponding to each agent to produce feature sets 188 that are used when and if needed for re-identification of agents, as discussed further below. The feature sets may include embedding vectors generated for each agent from different fields of view from different imaging devices within an event area and/or over different periods of time. In some implementations, each field of view of the agent that is captured and processed while the agent is within an event area may be included in the feature set 188 for that agent while in that event area, also referred to herein as a sub-session. In other examples, less than all of the embedding vectors may be included in the feature set and/or older embedding vectors may be replaced in the feature set as newer embedding vectors representative of the agent are generated while the agent is in the event area. For example, each new embedding vector may be compared with existing embedding vectors generated while the agent is in the event area. If the new embedding vector is very similar to an existing embedding vector, the existing embedding vector may be given a higher weight or score and the new embedding vector discarded. In comparison, if the new embedding vector is significantly different than existing embedding vectors associated with the agent, it may be retained in the feature set as representative of the agent.

By associating multiple embedding vectors generated from different fields of view of an event area, such as embedding vectors 183-1 and 183-2, and retaining significantly distinct embedding vectors as part of the feature set for an agent located within an embedding vector, re-identification is more robust as different views of the same agent may be compared and processed with the candidate sub-session tracklets of agents to be re-identified, as discussed below.

For example, the first agent 180-1, or the first tracklet for agent 180-1 generated for the first agent while the first agent is located within the event area will have an associated feature set 188-1 that includes embedding vectors generated over a period of time from image data generated by two different imaging devices within the event area. In this example, feature set 188-1 for agent 180-1 while agent 180-1 is within the event area 110 includes embedding vectors $EV_{1-1-0}$, $EV_{1-1-1}$, $EV_{1-1-2}$ through $EV_{1-1-N}$, each generated from image data of a first imaging device that has been segmented to include the first agent 180-1, during different periods of time from $t_0$ through $t_N$. In addition, the feature set 188-1, in this example, also includes embedding vectors $EV_{2-1-0}$, $EV_{2-1-1}$, $EV_{2-1-2}$ through $EV_{2-1-N}$, each generated from image data of a second imaging device within the event area that has been segmented to include the first agent 180-1, during different periods of time from $t_0$ through $t_N$.

Likewise, the second agent 180-2, or the second tracklet for agent 180-2, will have an associated feature set 188-2 that includes embedding vectors generated over a period of time from image data generated by two different imaging devices within the event area 110. In this example, feature set 188-2 for agent 180-2 includes embedding vectors $EV_{1-2-0}$, $EV_{1-2-1}$, $EV_{1-2-2}$ through $EV_{1-2-N}$, each generated from image data of a first imaging device within the event area, that has been segmented to include the second agent 180-2, during different periods of time from $t_0$ through $t_N$. In addition, the feature set 188-2, in this example, also includes embedding vectors $EV_{2-2-0}$, $EV_{2-2-1}$, $EV_{2-2-2}$ through $EV_{2-2-N}$, each generated from image data of a second imaging device within the event area that has been segmented to include the first agent 180-2, during different periods of time from $t_0$ through $t_N$.

The third agent 180-3, or the third tracklet for agent 180-3, will have an associated feature set 188-3 that includes embedding vectors generated over a period of time from image data generated by two different imaging devices within the event area. In this example, feature set 188-3 for agent 180-3 includes embedding vectors $EV_{1-3-0}$, $EV_{1-3-1}$, $EV_{1-3-2}$ through $EV_{1-3-N}$, each generated from image data of a first imaging device within the event area, that has been segmented to include the third agent 180-3, during different periods of time from $t_0$ through $t_N$. In addition, the feature set 188-3, in this example, also includes embedding vectors $EV_{2-3-0}$, $EV_{2-3-1}$, $EV_{2-3-2}$ through $EV_{2-3-N}$, each generated from image data of a second imaging device within the event area that has been segmented to include the first agent 180-3, during different periods of time from $t_0$ through $t_N$.

The fourth agent 180-4, or the fourth tracklet for agent 180-4, will have an associated feature set 188-4 that includes embedding vectors generated over a period of time from image data generated by two different imaging devices within the event area. In this example, feature set 188-4 for agent 180-4 includes embedding vectors $EV_{1-4-0}$, $EV_{1-4-1}$, $EV_{1-4-2}$ through $EV_{1-4-N}$, each generated from image data of a first imaging device within the event area, that has been segmented to include the fourth agent 180-4, during different periods of time from $t_0$ through $t_N$. In addition, the feature set 188-4, in this example also includes embedding vectors $EV_{2-4-0}$, $EV_{2-4-1}$, $EV_{2-4-2}$ through $EV_{2-4-N}$, each generated from image data of a second imaging device within the event area, that has been segmented to include the first agent 180-4, during different periods of time from $t_0$ through $t_N$.

As will be appreciated, additional embedding vectors from other fields of view of other imaging devices within the event are taken at the same or different times may likewise be included in one or more of the feature sets for different agents while those agents are positioned within the event area. Likewise, in some implementations, embedding vectors may be associated with an anonymous indicator corresponding to the agent such that the actual identity of the agent is not known and/or maintained by the implementations described herein.

Figure 1K:
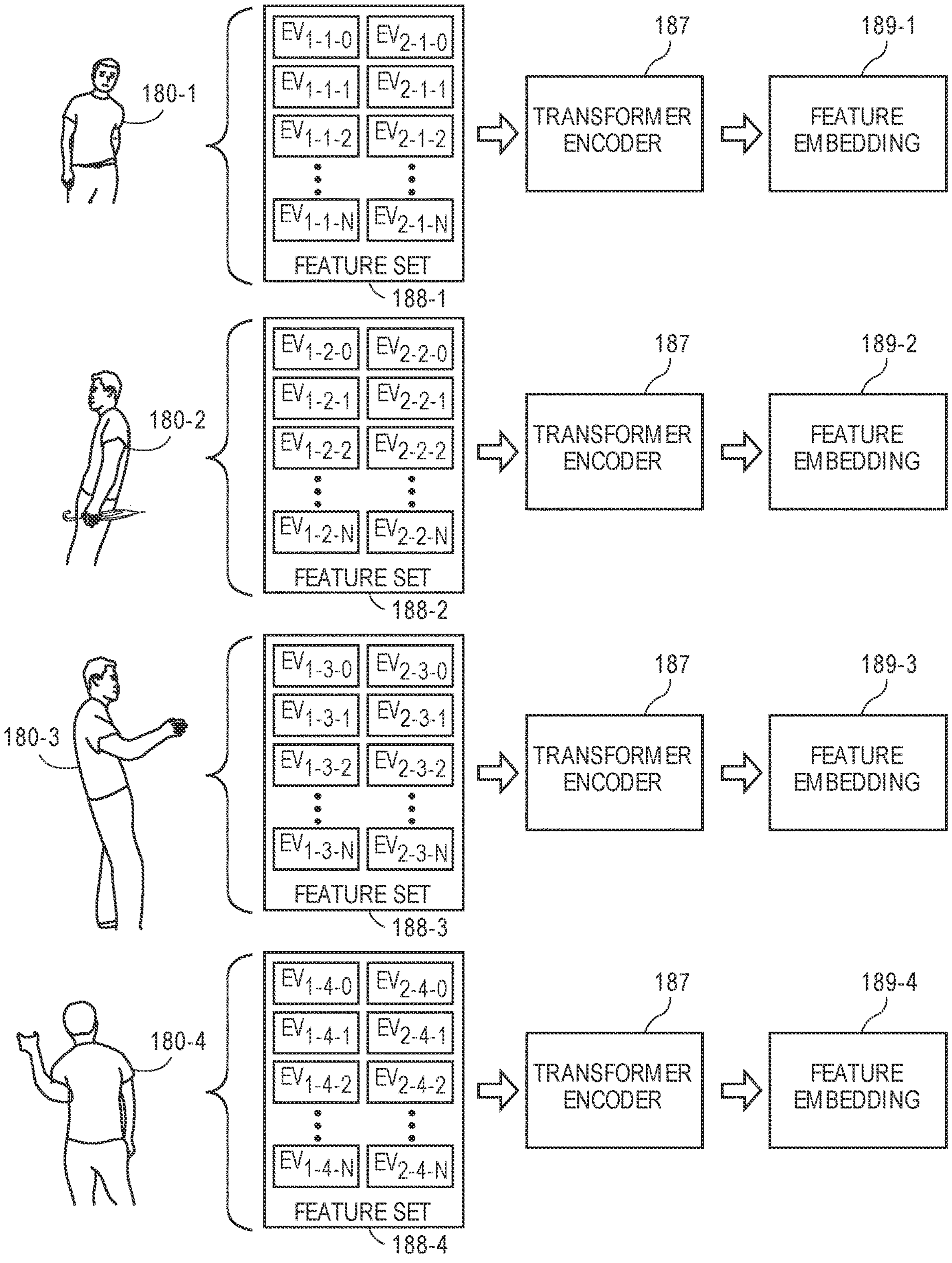

In some implementations, as illustrated in FIG. 1K, feature sets of embedding vectors may be further processed with a transformer encoder to generate feature embedding indicative of the feature set of embedding vectors, in accordance with disclosed implementations.

For example, the first feature set 188-1 generated for the first agent 180-1 while the first agent is located within the event area may be further processed by a transformer encoder 187 that encodes each embedding vector of the first feature set 188-1 into a first feature embedding 189-1 indicative of the feature set 188-1 of embedding vectors for the first agent 180-1.

Likewise, the second feature set 188-2 generated for the second agent 180-2 while the second agent is located within the event area may be further processed by the transformer encoder 187 that encodes each embedding vector of the second feature set 188-2 into a second feature embedding 189-2 indicative of the second feature set 188-2 of embedding vectors for the second agent 180-2. The third feature set 188-3 generated for the third agent 180-3 while the third agent is located within the event area may be further processed by the transformer encoder 187 that encodes each embedding vector of the third feature set 188-3 into a third feature embedding 189-3 indicative of the third feature set 188-3 of embedding vectors for the third agent 180-3. The fourth feature set 188-4 generated for the fourth agent 180-4 while the fourth agent is located within the event area may be further processed by the transformer encoder 187 that encodes each embedding vector of the fourth feature set 188-4 into a fourth feature embedding 189-4 indicative of the fourth feature set 188-4 of embedding vectors for the fourth agent 180-4.

As agents move between the multiple different event areas, new tracklets and corresponding feature embeddings for each agent are generated for each of the different event areas within the materials handling facility and a different anonymous indicator and tracklet may be associated with the different tracklets in the different event areas. For purposes of discussion, each time a tracklet with a corresponding feature embedding is generated for an agent while an agent is positioned within an event area of a materials handling facility will be referred to herein as a sub-session tracklet.

Figure 1L:
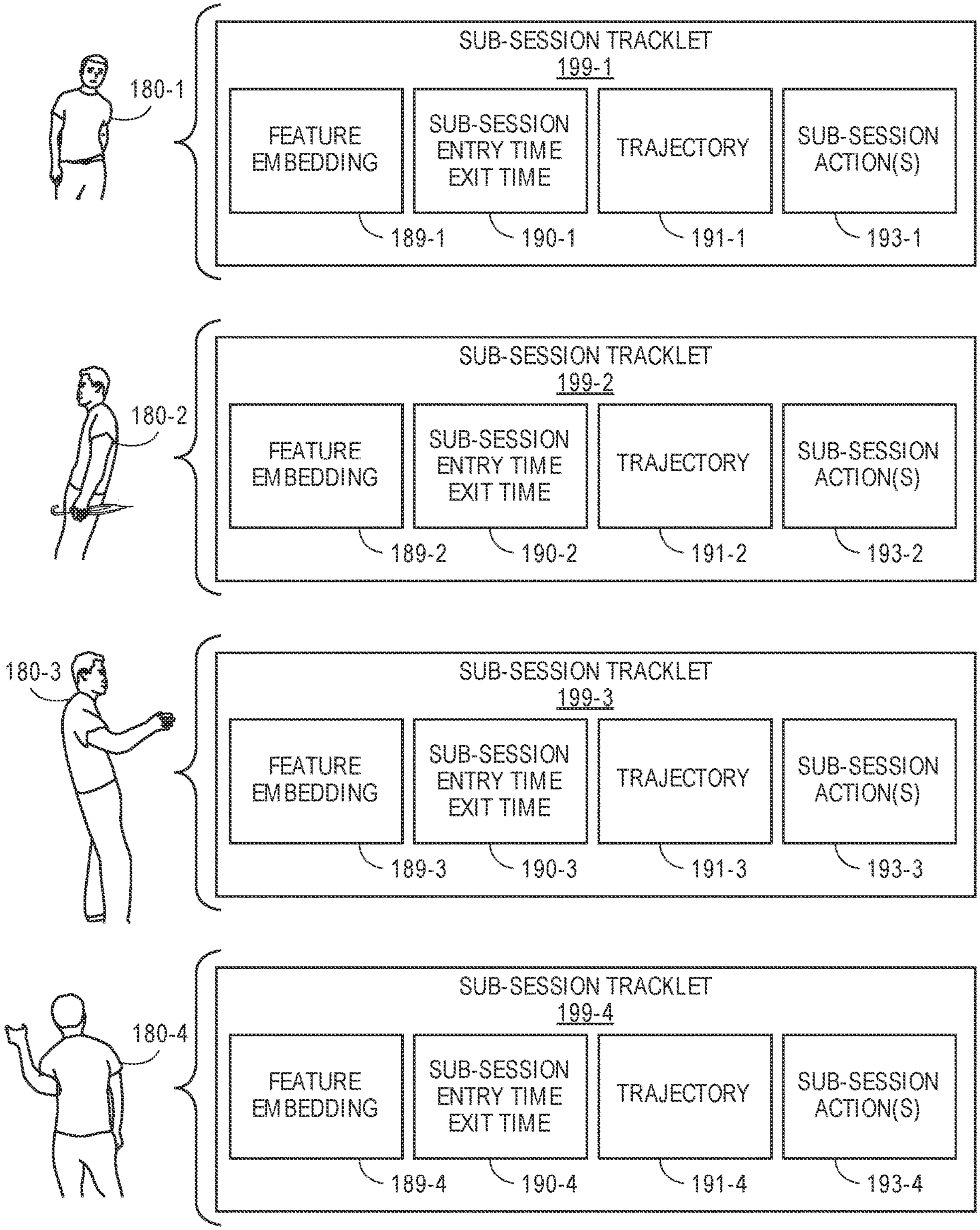

FIG. 1L illustrates sub-session tracklets 199-1, 199-2, 199-3, 199-4 generated for each of the first agent 180-1, the second agent 180-2, the third agent 180-3, and the fourth agent 180-4 during a sub-session within an event area, in accordance with disclosed implementations.

As illustrated and discussed herein, each sub-session tracklet 199-1, 199-2, 199-3 199-4 may include, for example, a feature embedding indicative of the agent, a sub-session entry time and/or exit time indicative of a time the agent entered the event area and a time the agent exited the event area, respectively. Likewise, a trajectory of the agent as the agent progressed through the event area may be included in the sub-session tracklet. As still another example, each sub-session tracklet may further include a sub-session actions list 193-1 indicating any actions (e.g., item pick, item place) performed by the agent while the agent was in the event area. In some examples, an item list of items picked by the agent while in the event area may also be included in the sub-session tracklet. As will be appreciated, in some implementations, additional or fewer information may be included in a sub-session tracklet for an agent while the agent is located in an event area.

As illustrated in FIG. 1L, a first sub-session tracklet 199-1 is generated for the first agent 180-1 that includes a first feature embedding 189-1 indicative of the feature set of embedding vectors generated for the first agent 180-1, a first sub-session entry time and exit time 190-1, a first trajectory 191-1, and a first sub-session actions list 193-1. Likewise, a second sub-session tracklet 199-2 is generated for the second agent 180-2 that includes a second feature embedding 189-2 indicative of the feature set of embedding vectors generated for the second agent 180-2, a second sub-session entry time and exit time 190-2, a second trajectory 191-2, and a second sub-session actions list 193-2. A third sub-session tracklet 199-3 is generated for the third agent 180-3 that includes a third feature embedding 189-3 indicative of the feature set of embedding vectors generated for the third agent 180-3, a third sub-session entry time and exit time 190-3, a third trajectory 191-3, and a third sub-session actions list 193-3. A fourth sub-session tracklet 199-4 is generated for the fourth agent 180-4 that includes a fourth feature embedding 189-4 indicative of the feature set of embedding vectors generated for the fourth agent 180-4, a fourth sub-session entry time and exit time 190-4, a fourth trajectory 191-4, and a fourth sub-session actions list 193-4.

As will be appreciated, as there may be multiple different event areas within a materials handling facility and an agent may move between two or more event areas multiple times, even entering/existing the same event area more than once, while the agent is within the materials handling facility, multiple different sub-session tracklets may be generated for the same agent. As each sub-session tracklet is generated, it may be maintained by the disclosed implementations in an unlinked sub-session tracklet list until the tracklet is re-identified and associated with an agent.

As discussed herein, the embedding vectors of feature sets of agents and/or feature embeddings indicative of those feature sets may be maintained in a data store and/or generated on-demand and used to re-identify an agent and/or a position of an agent within a materials handling facility. Likewise, as discussed below, embedding vectors may be used as initial and/or ongoing training inputs to the machine learning system to increase the accuracy of re-identification of agents within the materials handling facility. For example, embedding vectors of a known image of an agent may be identified as an anchor training input and two other embedding vectors, one of which corresponds to another known image of the same agent and one of which corresponds to an image of a different agent may be provided as positive and negative inputs. Those inputs may be used to train the machine learning system to distinguish between similar and different embedding vectors representative of agents.

In some implementations, agents may have the option to consent or selectively decide what imaging data may be used, stored, and/or maintained in a data store and/or used as inputs or training to the machine learning system and/or implementations discussed herein.

In some implementations, such as where the event area 110 includes a large number of imaging devices, or where a substantially large number of images must be evaluated to re-identify an agent, the images may be evaluated to determine their respective levels of quality by any algorithm or technique, e.g., one or more trained machine learning systems or techniques, such as a convolutional neural network or another artificial neural network, or a support vector machine (e.g., a linear support vector machine) or another classifier. Images may be selected or excluded from consideration for generation of embedding vectors, or the confidence scores of the various agents depicted within such images may be adjusted accordingly, in order to enhance the likelihood that an agent may be properly re-identified.

Accordingly, implementations of the systems and methods of the present disclosure may capture imaging data from an event area using a plurality of digital cameras or other imaging devices that are aligned with various fields of view within the event area. In some implementations, two or more of the digital cameras or other imaging devices may have fields of view that overlap with one another at least in part, such as the imaging devices 120-1, 120-2 of FIGS. 1A and 1B. In other implementations, the digital cameras or other imaging devices need not have overlapping fields of view. Likewise, as illustrated and discussed below with respect to FIG. 5, different event areas within the materials handling facility may not overlap and may be several feet, or any distance apart from each other. Accordingly, the fields of view of imaging devices of one event area may not overlap with the fields of view of any other event area within the materials handling facility.

Those of ordinary skill in the pertinent arts will recognize that imaging data, e.g., visual imaging data, infrared imaging data, radiographic imaging data, or imaging data of any other type or form, may be captured using one or more imaging devices such as digital cameras, infrared cameras, radiographic cameras, etc. Such devices generally operate by capturing light that is reflected from objects, and by subsequently calculating or assigning one or more quantitative values to aspects of the reflected light, e.g., image pixels, then generating an output based on such values, and storing such values in one or more data stores. For example, a digital camera may include one or more image sensors (e.g., a photosensitive surface with a plurality of pixel sensors provided thereon), having one or more filters associated therewith. Such sensors may detect information regarding aspects of any number of image pixels of the reflected light corresponding to one or more base colors (e.g., red, green, or blue) of the reflected light. Such sensors may then generate data files including such information, and store such data files in one or more onboard or accessible data stores (e.g., a hard drive or other like component), or in one or more removable data stores (e.g., flash memory devices). Such data files, also referred to herein as imaging data, may also be printed, displayed on one or more broadcast or closed-circuit television networks, or transmitted over a computer network, such as the Internet.

An imaging device that is configured to capture and store visual imaging data (e.g., color images) is commonly called an RGB ("red-green-blue") imaging device (or camera). Imaging data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), QuickTime (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., a zoom level of the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

Similarly, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Furthermore, some imaging devices may digitally or electronically adjust an image identified in a field of view, subject to one or more physical or operational constraints. For example, a digital camera may virtually stretch or condense the pixels of an image in order to focus or broaden the field of view of the digital camera, and also translate one or more portions of images within the field of view. Some imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of image pixels, or of groups of image pixels, in a digital image may be determined and quantified according to one or more standards, e.g., the RGB color model, in which the portions of red, green or blue in an image pixel are expressed in three corresponding numbers ranging from 0 to 255 in value, or a hexadecimal model, in which a color of an image pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color candy apple red is expressed as #FF0800. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations (e.g., intervals of time). Such algorithms or tools may be directed to recognizing and marking transitions (e.g., the contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny detectors or algorithms; Sobel operators, algorithms or filters; Kayyali operators; Roberts detection algorithms; Prewitt operators; Frei-Chen methods; YOLO method; or any other algorithms or techniques that may be known to those of ordinary skill in the pertinent arts. For example, objects or portions thereof expressed within imaging data may be associated with a label or labels according to one or more machine learning classifiers, algorithms or techniques, including but not limited to nearest neighbor methods or analyses, artificial neural networks, support vector machines, factorization methods or techniques, K-means clustering analyses or techniques, similarity measures such as log likelihood similarities or cosine similarities, latent Dirichlet allocations or other topic models, or latent semantic analyses.

The systems and methods of the present disclosure may be utilized in any number of applications in which re-identification of an agent is desired, including but not limited to identifying agents involved in events occurring within a materials handling facility. As used herein, the term "materials handling facility" may include, but is not limited to, warehouses, distribution centers, cross-docking facilities, order fulfillment facilities, packaging facilities, shipping facilities, rental facilities, libraries, retail stores or establishments, wholesale stores, museums, or other facilities or combinations of facilities for performing one or more functions of material or inventory handling for any purpose. For example, in some implementations, one or more of the systems and methods disclosed herein may be used to detect and distinguish between agents (e.g., customers) and recognize their respective interactions within a materials handling facility, including but not limited to interactions with one or more items (e.g., consumer goods) within the materials handling facility. Such systems and methods may also be utilized to identify and locate agents and their interactions within transportation centers, financial institutions or like structures in which diverse collections of people, objects or machines enter and exit from such environments at regular or irregular times or on predictable or unpredictable schedules.

Figure 2:
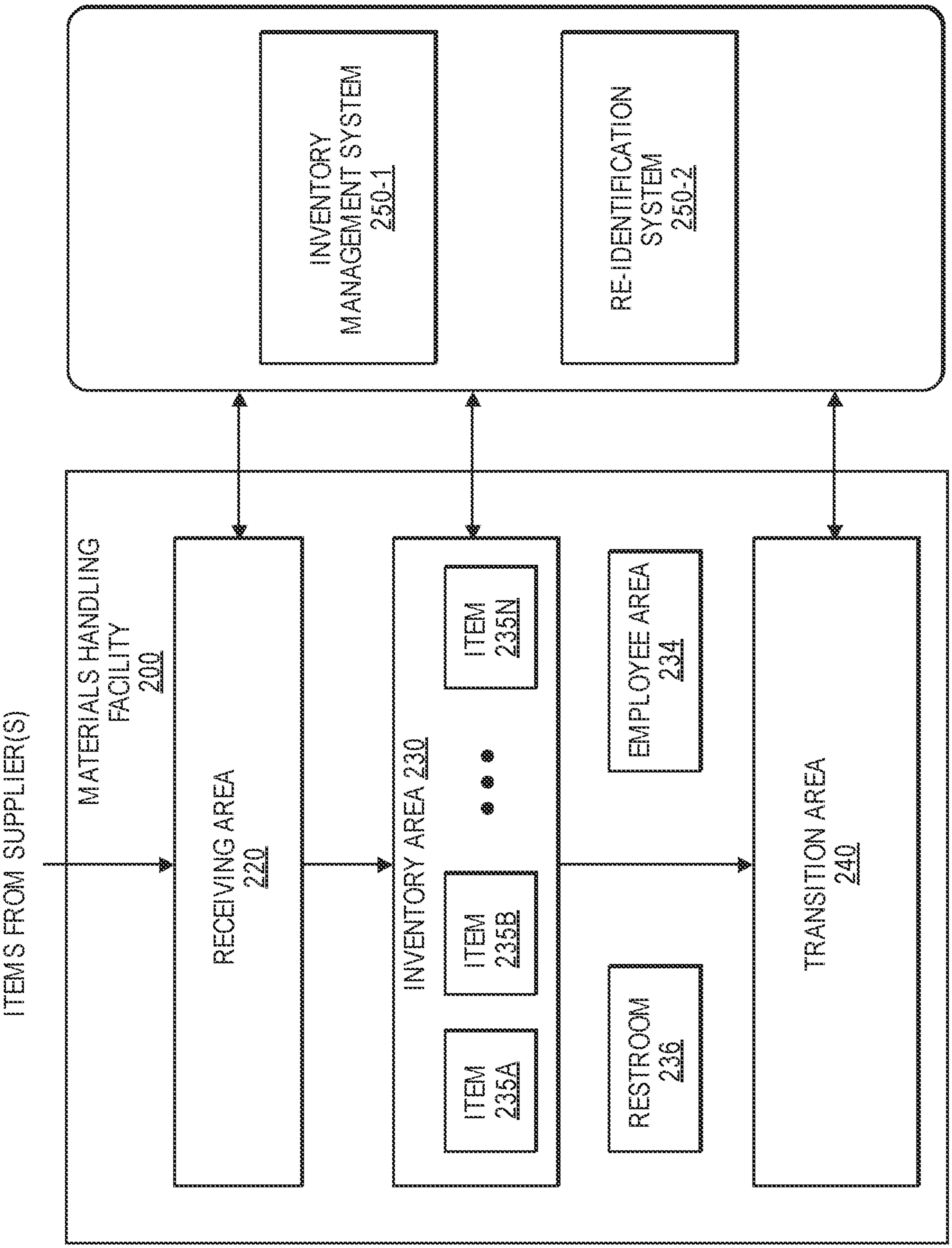
FIG. 2 is a block diagram illustrating a materials handling facility, in accordance with implementations of the present disclosure.

An implementation of a materials handling facility configured to store and manage inventory items is illustrated in FIG. 2. As shown, a materials handling facility 200 includes a receiving area 220, an inventory area 230 configured to store an arbitrary number of inventory items 235A, 235B, through 235N, one or more transition areas 240, one or more restrooms 236, and one or more employee areas 234 or breakrooms. The arrangement of the various areas within materials handling facility 200 is depicted functionally rather than schematically. For example, in some implementations, multiple different receiving areas 220, inventory areas 230 and transition areas 240 may be interspersed rather than segregated. Additionally, the materials handling facility 200 includes an inventory management system 250-1 configured to interact with each of receiving area 220, inventory area 230, transition area 240 and/or agents within the materials handling facility 200. Likewise, the materials handling facility includes a re-identification system 250-2 configured to interact with image capture devices at each of the receiving area 220, inventory area 230, and/or transition area 240 and to track agents as they move throughout the materials handling facility 200.

The materials handling facility 200 may be configured to receive different kinds of inventory items 235 from various suppliers and to store them until an agent orders or retrieves one or more of the items. The general flow of items through the materials handling facility 200 is indicated using arrows. Specifically, as illustrated in this example, items 235 may be received from one or more suppliers, such as manufacturers, distributors, wholesalers, etc., at receiving area 220. In various implementations, items 235 may include merchandise, commodities, perishables, or any suitable type of item depending on the nature of the enterprise that operates the materials handling facility 200.

Upon being received from a supplier at receiving area 220, items 235 may be prepared for storage. For example, in some implementations, items 235 may be unpacked or otherwise rearranged and the inventory management system 250-1 (which, as described below, may include one or more software applications executing on a computer system) may be updated to reflect the type, quantity, condition, cost, location or any other suitable parameters with respect to newly received items 235. It is noted that items 235 may be stocked, managed or dispensed in terms of countable, individual units or multiples of units, such as packages, cartons, crates, pallets or other suitable aggregations. Alternatively, some items 235, such as bulk products, commodities, etc., may be stored in continuous or arbitrarily divisible amounts that may not be inherently organized into countable units. Such items 235 may be managed in terms of measurable quantities such as units of length, area, volume, weight, time duration or other dimensional properties characterized by units of measurement. Generally speaking, a quantity of an item 235 may refer to either a countable number of individual or aggregate units of an item 235 or a measurable amount of an item 235, as appropriate.

After arriving through receiving area 220, items 235 may be stored within inventory area 230 on an inventory shelf. In some implementations, like items 235 may be stored or displayed together in bins, on shelves or via other suitable storage mechanisms, such that all items 235 of a given kind are stored in one location. In other implementations, like items 235 may be stored in different locations. For example, to optimize retrieval of certain items 235 having high turnover or velocity within a large physical facility, those items 235 may be stored in several different locations to reduce congestion that might occur at a single point of storage.

When an order specifying one or more items 235 is received, or as an agent progresses through the materials handling facility 200, the corresponding items 235 may be selected or "picked" from the inventory area 230. For example, in one implementation, an agent may have a list of items to pick and may progress through the materials handling facility picking items 235 from the inventory area 230. In other implementations, materials handling facility employees (referred to herein as agents) may pick items 235 using written or electronic pick lists derived from orders. In some instances, an item may need to be repositioned from one location within the inventory area 230 to another location. For example, in some instances, an item may be picked from its inventory location, moved a distance and placed at another location.

As discussed further below, as the agent moves through the materials handling facility into and out of event areas, images of the agent while the agent is in an event area may be obtained and processed by the system to maintain a sub-session tracklet corresponding to the agent while the agent is in an event area.

Figure 3:
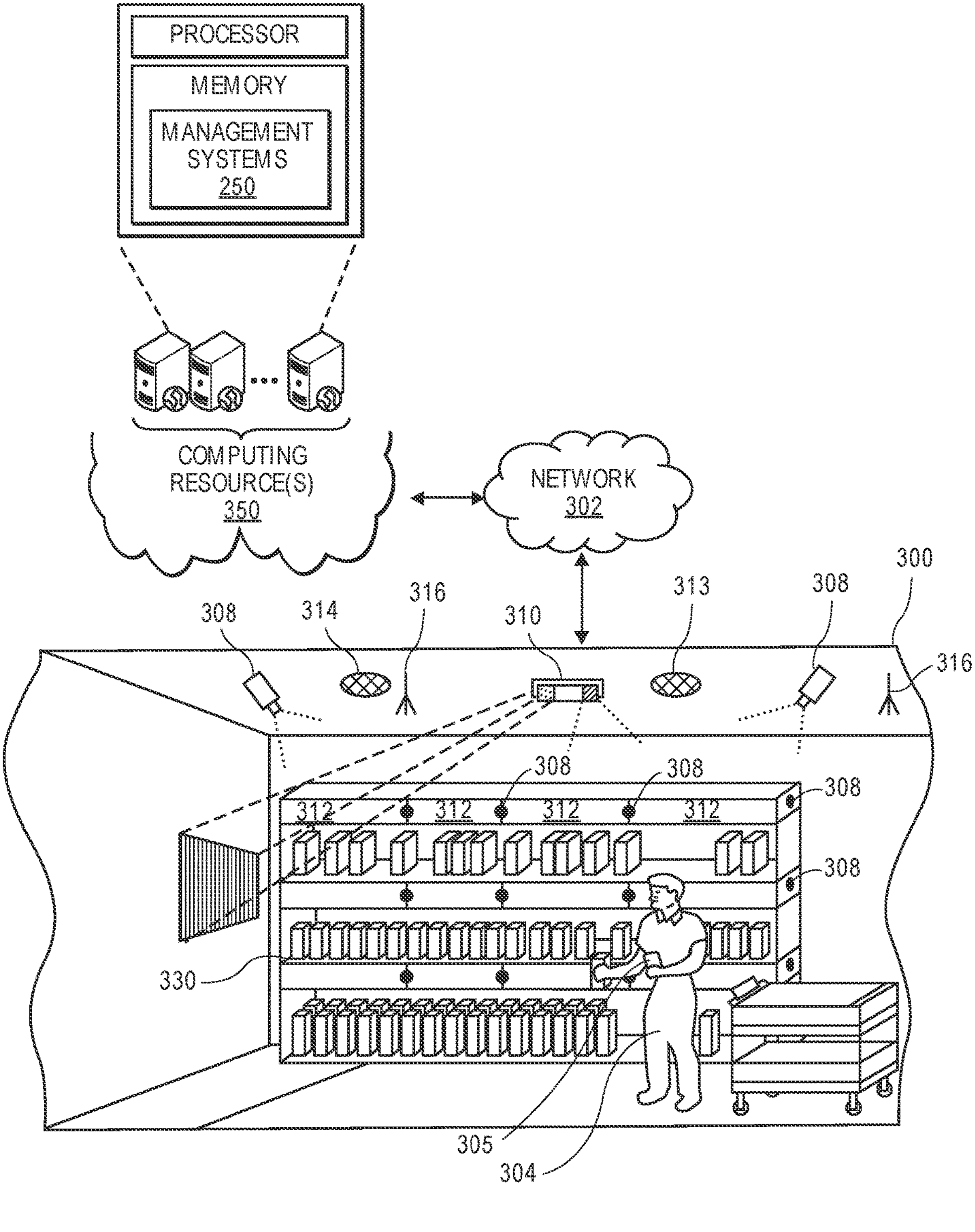
FIG. 3 shows additional components of the materials handling facility of FIG. 2, in accordance with implementations of the present disclosure.

FIG. 3 shows additional components of a materials handling facility 300, according to one implementation. Generally, the materials handling facility 300 may include one or more image capture devices, such as cameras 308. For example, one or more cameras 308 may be positioned in locations of the materials handling facility 300 so that images of locations, items, and/or agents within the materials handling facility can be captured. In some implementations, the image capture devices 308 may be positioned overhead, such as on the ceiling, and oriented toward a surface (e.g., floor) of the materials handling facility so that the image capture devices 308 are approximately perpendicular with the surface and the field of view is oriented toward the surface. The overhead image capture devices 308 may then be used to capture images of agents and/or locations within the materials handling facility from an overhead view. In addition, in some implementations, one or more cameras 308 may be positioned on or inside of inventory areas. For example, a series of cameras 308 may be positioned on external portions of the inventory areas and positioned to capture images of agents and/or the location surrounding the inventory area.

In addition to cameras, other input devices, such as pressure sensors, infrared sensors, scales, light curtains, load cells, RFID readers, etc., may be utilized with the implementations described herein. For example, a pressure sensor and/or a scale may be used to detect the presence or absence of items and/or to determine when an item is added and/or removed from inventory areas. Likewise, a light curtain may be virtually positioned to cover the front of an inventory area and detect when an object (e.g., an agent's hand) passes into or out of the inventory area. The light curtain may also include a reader, such as an RFID reader, that can detect a tag included on an item as the item passes into or out of the inventory location. For example, if the item includes an RFID tag, an RFID reader may detect the RFID tag as the item passes into or out of the inventory location. Alternatively, or in addition thereto, the inventory shelf may include one or more antenna elements coupled to an RFID reader that are configured to read RFID tags of items located on the inventory shelf.

When an agent 304 arrives at the materials handling facility 300 and passes through an entry event area, one or more images of the agent 304 may be captured and processed as discussed herein. For example, the images of the agent 304 may be processed to identify the agent and/or generate a feature set that includes embedding vectors representative of the agent and/or a feature embedding for the agent. In some implementations, rather than or in addition to processing images to identify the agent 304, other techniques may be utilized to identify the agent. For example, the agent may provide an identification (e.g., agent name, password), the agent may present an identifier (e.g., identification badge, card), an RFID tag in the possession of the agent may be detected, a visual tag (e.g., barcode, bokode, watermark) in the possession of the agent may be detected, biometrics may be utilized to identify the agent, a smart phone or other device associated with the agent may be detected and/or scanned, etc.

For example, an agent 304 located in the materials handling facility 300 may possess a portable device 305 that is used to identify the agent 304 when they enter the materials handling facility and/or to provide information about items located within the materials handling facility 300, receive confirmation that the inventory management system has correctly identified items that are picked and/or placed by the agent, receive requests for confirmation regarding one or more event aspects, etc. Generally, the portable device has at least a wireless module to facilitate communication with the management systems 250 (e.g., the inventory management system) and a display (e.g., a touch based display) to facilitate visible presentation to and interaction with the agent. The portable device may store a unique identifier and provide that unique identifier to the management systems 250 and be used to identify the agent. In some instances, the portable device may also have other features, such as audio input/output (e.g., speaker(s), microphone(s)), video input/output (camera(s), projector(s)), haptics (e.g., keyboard, keypad, touch screen, joystick, control buttons) and/or other components.

In some instances, the portable device 305 may operate in conjunction with or may otherwise utilize or communicate with one or more components of the management systems 250. Likewise, components of the management systems 250 may interact and communicate with the portable device 305 as well as identify the agent 304, communicate with the agent via other means and/or communicate with other components of the management systems 250.

Generally, the management systems 250 may include one or more input/output devices, such as imaging devices (e.g., cameras) 308, projectors 310, displays 312, speakers 313, microphones 314, multiple-camera apparatus, illumination elements (e.g., lights), etc., to facilitate communication between the management systems 250 and/or the agent 304 and detection of items, events and/or other actions within the materials handling facility 300. In some implementations, multiple input/output devices may be distributed within the materials handling facility 300. For example, there may be multiple imaging devices, such as cameras located on the ceilings and/or cameras (such as pico-cameras) located in the aisles near the inventory items.

Likewise, the management systems 250 may also include one or more communication devices, such as wireless antennas 316, which facilitate wireless communication (e.g., Wi-Fi, Near Field Communication (NFC), Bluetooth) between the management systems 250 and other components or devices. The management systems 250 may also include one or more computing resource(s) 350, such as a server system, that may be local to the environment (e.g., materials handling facility), remote from the environment, or any combination thereof.

The management systems 250 may utilize antennas 316 within the materials handling facility 300 to create a network 302 (e.g., Wi-Fi) so that the components and devices can connect to and communicate with the management systems 250. For example, when the agent 304 picks an item 335 from an inventory area 330, a camera 308 may detect the removal of the item and the management systems 250 may receive information, such as image data of the performed action (item pick from the inventory area), identifying that an item has been picked from the inventory area 330. The event aspects (e.g., agent identity, action performed, item involved in the event) may then be determined by the management systems 250.

Figure 4:
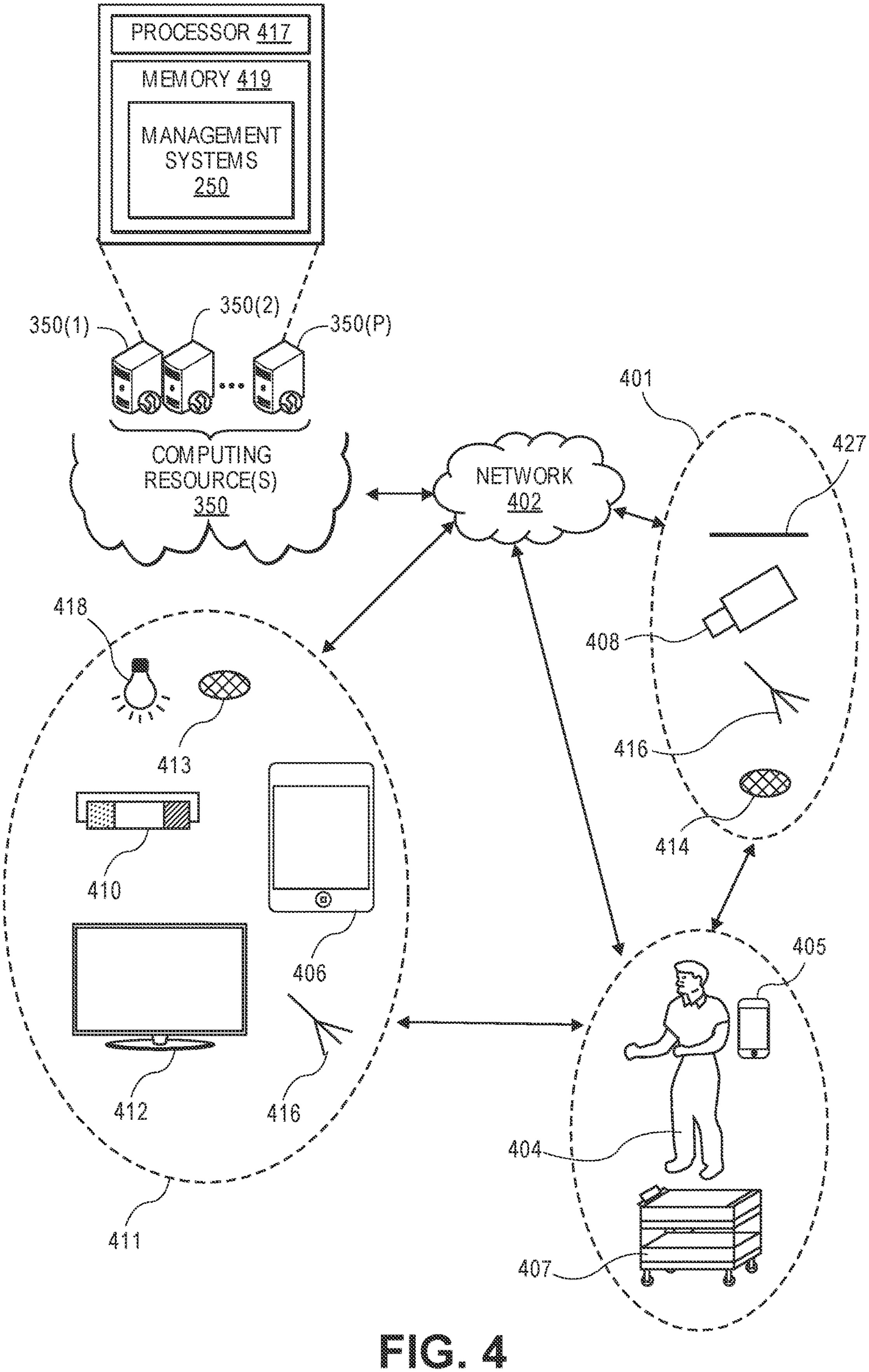
FIG. 4 shows components and communication paths between component types utilized in a materials handling facility of FIG. 2, in accordance with implementations of the present disclosure.

FIG. 4 shows example components and communication paths between component types utilized in a materials handling facility 200, in accordance with one implementation. A portable device 405 may communicate and interact with various components of management systems 250 over a variety of communication paths. Generally, the management systems 250 may include input components 401, output components 411 and computing resource(s) 350. The input components 401 may include an imaging device 408, a multiple-camera apparatus 427, microphone 414, antenna 416, or any other component that is capable of receiving input about the surrounding environment and/or from the agent. The output components 411 may include a projector 410, a portable device 406, a display 412, an antenna 416, a radio, speakers 413, illumination elements 418 (e.g., lights), and/or any other component that is capable of providing output to the surrounding environment and/or the agent.

The management systems 250 may also include computing resource(s) 350. The computing resource(s) 350 may be local to the environment (e.g., materials handling facility), remote from the environment, or any combination thereof. Likewise, the computing resource(s) 350 may be configured to communicate over a network 402 with input components 401, output components 411 and/or directly with the portable device 405, an agent 404 and/or a tote 407.

As illustrated, the computing resource(s) 350 may be remote from the environment and implemented as one or more servers 350(1), 350(2), . . . , 350(P) and may, in some instances, form a portion of a network-accessible computing platform implemented as a computing infrastructure of processors, storage, software, data access, and so forth that is maintained and accessible by components/devices of the management systems 250 and/or the portable device 405 via a network 402, such as an intranet (e.g., local area network), the Internet, etc. The server system 350 may process images of an agent 404 to identify the agent, process images of items to identify items, determine a location of items and/or determine a position of items. The server system(s) 350 does not require end-user knowledge of the physical location and configuration of the system that delivers the services. Common expressions associated for these remote computing resource(s) 350 include "on-demand computing," "software as a service (SaaS)," "platform computing," "network-accessible platform," "cloud services," "data centers," and so forth.

Each of the servers 350(1)-(P) include a processor 417 and memory 419, which may store or otherwise have access to management systems 250, which may include or provide image processing (e.g., for agent identification, expression identification, and/or item identification), inventory tracking, and/or location determination.

The network 402 may utilize wired technologies (e.g., wires, USB, fiber optic cable, etc.), wireless technologies (e.g., radio frequency, infrared, NFC, cellular, satellite, Bluetooth®, etc.), or other connection technologies. The network 402 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth®, etc.), and/or other connection technologies.

Figure 5:
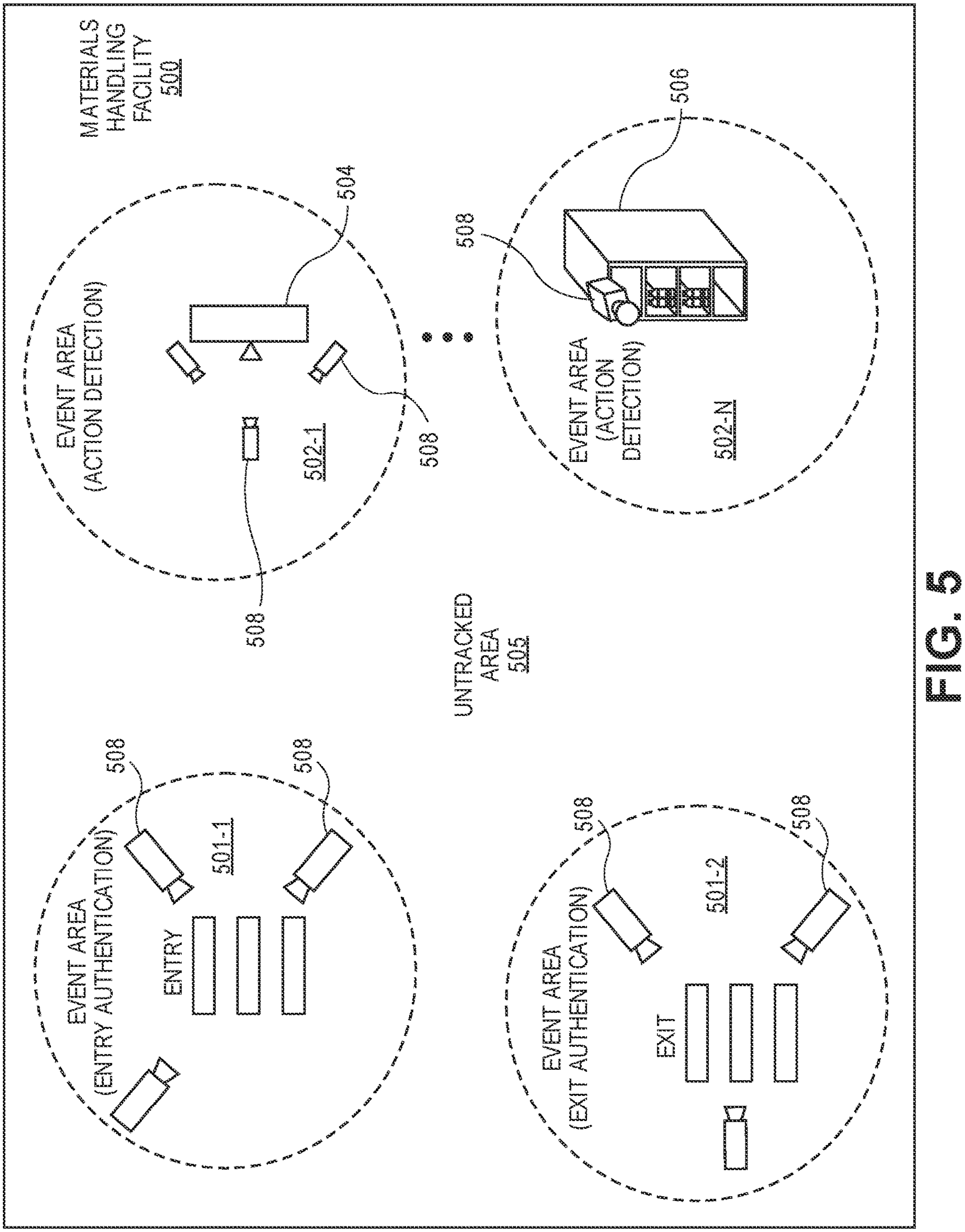
FIG. 5 is a block diagram of an overhead view of a materials handling facility that utilizes sparse tracking for agent re-identification, in accordance with implementations of the present disclosure.

FIG. 5 is a block diagram of an overhead view of a portion of a materials handling facility 500 that includes multiple different event areas 501-1, 501-2, 502-1, through 502-N, according to an implementation. As illustrated, each event area 501-1, 501-2, 502-1, through 502-N may be completely separate from and distinct from other event areas 501-1, 501-2, 502-1, through 502-N within the materials handling facility. In this example, within each event area 501-1, 501-2, 502-1, through 502-N a plurality of cameras 508 are positioned overhead (e.g., on a ceiling), on a shelf, and/or at any other location within each event area so that the collective field of view of the cameras within an event area covers the surface of the event area. In some implementations, a grid system, physical or virtual, is oriented with the shape of the event area. The grid 502 may be utilized to attach or mount cameras within the event area at defined locations with respect to the physical space of the event area. For example, in some implementations, the cameras may be positioned at any one foot increment from other cameras along the grid within each event area. In other implementations, the cameras 508 may be positioned at other locations within an event area. For example, if the event area includes an inventory unit, such as shelving or a cabinet, some or all of the imaging devices may be coupled to or included with the inventory unit and oriented to include fields of view of the event area. In such a configuration, some or all of the cameras 508 of the event area may be modular, thereby reducing the overall cost to establish imaging devices within an event area of the materials handling facility 500.

As also illustrated, with the disclosed implementations, portions of the materials handling facility 500 that are not included with an event area, referred to herein as an untracked area(s) 505, may not include any cameras or other imaging devices and/or image data from any imaging devices in those untracked areas may not be used by the disclosed implementations to re-identify an agent as the agent moves within the materials handling facility 500. Accordingly, an agent may move through significant portions of the materials handling facility 500 without imaging devices tracking the agent's movement.

In some event areas, such as area event area 502-1, cameras 508 may be positioned closer together and/or closer to the surface area, thereby reducing their field of view, increasing the amount of field of view overlap, and/or increasing the amount of coverage for the event area. Increasing camera density may be desirable in areas where there is a high volume of activity (e.g., item picks, item places, agent dwell time), high traffic areas, high value items, poor lighting conditions, etc. By increasing the amount of coverage, the image data increases, thereby increasing the likelihood that an activity or action will be properly determined. In comparison, by not including cameras 508 in untracked areas 505 reduces processing requirements, bandwidth constraints, and production/maintenance costs. In such an implementation, agents may move in and out of event areas and be re-identified on a periodic basis, as discussed herein.

The cameras 508 may obtain images (still images or video) and process those images to reduce the image data and/or provide the image data to other components. As discussed herein, image data for each image or frame may be reduced using background/foreground segmentation to only include pixel information for pixels that have been determined to have changed. For example, baseline image information may be maintained for a field of view of a camera corresponding to the static or expected view of the event area in which the camera is positioned within the materials handling facility. Image data for an image may be compared to the baseline image information and the image data may be reduced by removing or subtracting out pixel information that is the same in the image data as the baseline image information. Image data reduction may be done by each camera. Alternatively, groups of cameras within an event area may be connected with a camera processor that processes image data from a group of cameras to reduce the image data of those cameras.

Figure 6A:
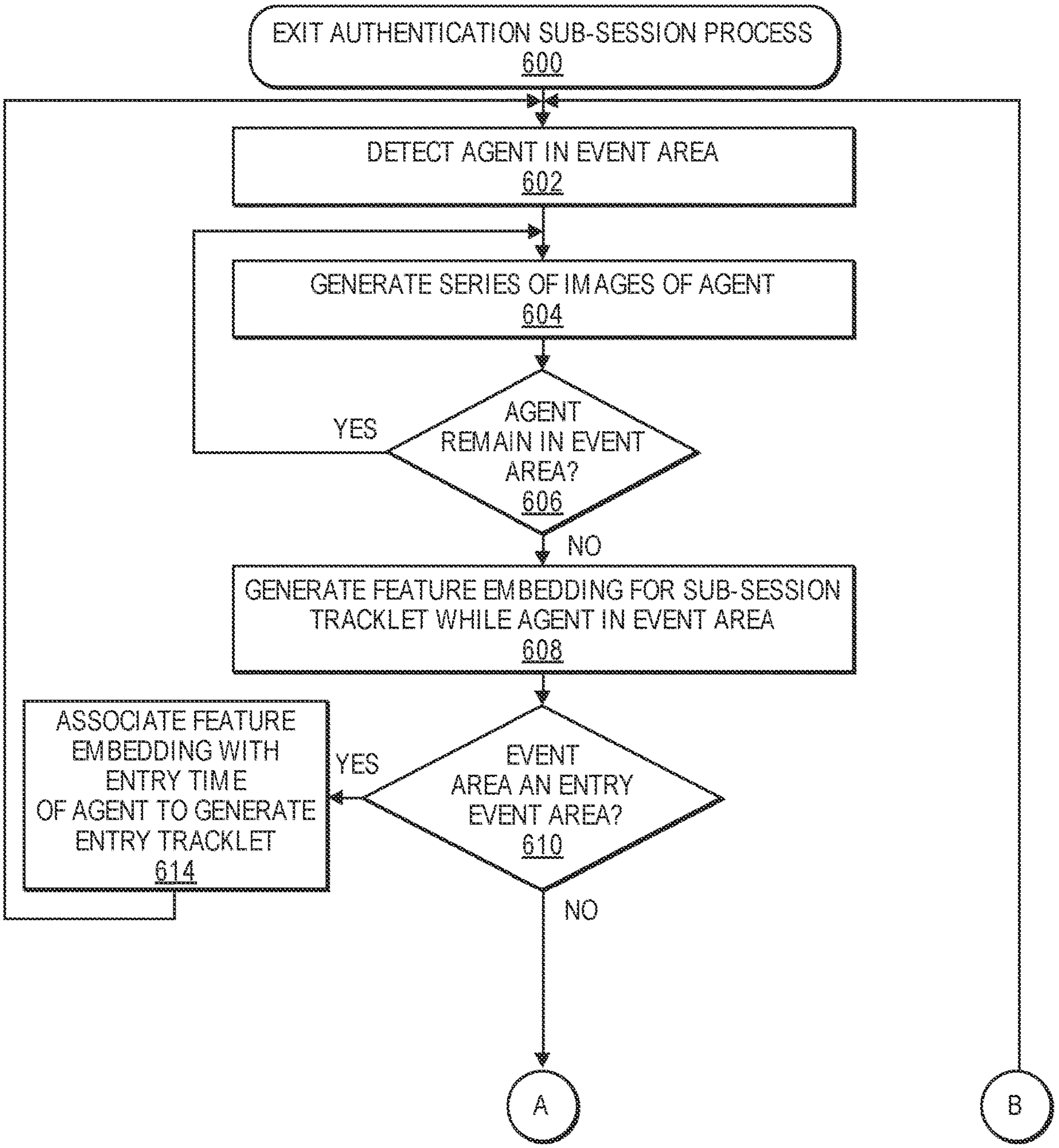
FIGS. 6A and 6B illustrate an example exit authentication sub-session process, in accordance with implementations of the present disclosure.
Figure 6B:
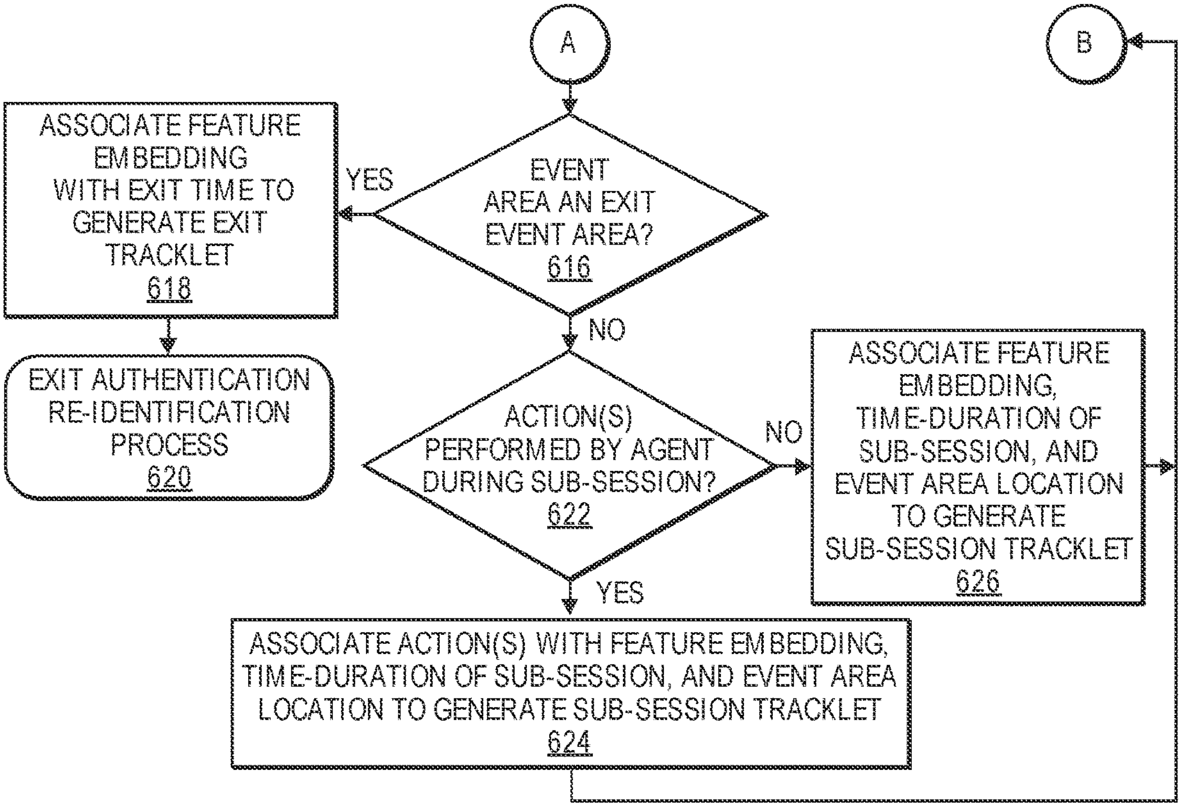

FIGS. 6A and 6B illustrate an example exit authentication sub-session process 600, in accordance with implementations of the present disclosure. Some or all of the example process 600 may be performed independently for each event area within a materials handling facility and/or some or all of the example process may be performed for all or a sub-set of all event areas of a materials handling facility.

The example process 600 begins upon detecting an agent entering an event area, as in 602. For example, as image data from an imaging element (e.g., camera) of an event area is processed, a representation of the agent may be detected in the image data. As the agent is within the field of view of one or more cameras of the event area, images (e.g., still images and/or video) of the agent are generated, as in 604. As images are generated, a determination may be made as to whether the agent remains in the event area, as in 606. For example, as images are generated, the images may be initially processed to determine if a representation of the agent remains in one or more images. If the agent is determined to still be in the event area, the example process 600 returns to block 604 and continues generating images of the agent. If it is determined that the agent has left the event area, a feature embedding that is indicative of a feature set that includes one or more embedding vectors representative of the agent is generated for a sub-session tracklet of the agent that is representative of the agent while the agent was in the event area, as in 608. Generation of a sub-session tracklet and feature embedding for a sub-session while the agent is within the event area is discussed above. The sub-session tracklet may include, for the feature embedding, a time duration or timestamps indicating when the agent was positioned within the event area, the location of the event area within the materials handling facility, an indication of any actions (e.g., item pick, item place) or any items performed by the agent while the agent was located in the event area, etc.

A determination may then be made as to whether the event area is an entry event area, as in 610. An entry event area may be a designated event area within a materials handling facility, such as an entry location into a materials handling facility or an entry location into a specific portion of a materials handling facility. For example, some materials handling facilities may include different areas with, for example, different levels of authorized access. In such a configuration, the different areas may each have designated entry and exit event areas.

If it is determined that the event area is an entry event area, the feature embedding generated while the agent was in the event area may be associated with an entry time and/or a time duration at which the agent was in the entry event area to generate an entry tracklet for the agent while the agent was positioned within the entry event area, as in 614. In some implementations, as part of entry, the agent may also provide identification, such as biometrics, password, keycard identifier, etc., that is known to the system and can be used to associate the entry tracklet with an agent account maintained by the system. After generating the entry tracklet, the example process returns to block 602 and continues.

If it is determined at decision block 610 that the event area is not an entry event area, a determination may be made as to whether the event area is an exit event area, as in 616. In comparison to an entry event area, an exit event area may be a designated event area within a materials handling facility, such as an exit location out of a materials handling facility or an exit location out of a specific portion of a materials handling facility. For example, some materials handling facilities may include different areas with, for example, different levels of authorized access. In such a configuration, the different areas may each have designated entry and exit event areas.

If it is determined that the event area is an exit event area, the feature embedding generated while the agent was in the event area may be associated with an exit time and/or a time duration at which the agent was in the exit event area to generate an exit tracklet for the agent while the agent was positioned within the exit event area, as in 618. In some implementations, as part of exit, the agent may also provide identification, such as biometrics, password, keycard identifier, etc., that is known to the system and can be used to associate the exit tracklet with an agent account maintained by the system. After generating the exit tracklet, the example process 600 may complete with performance of the exit authentication re-identification process discussed below with respect to FIGS. 8A and 8B, as in 620.

If it is determined at decision block 616 that the event area is not an exit event area, a determination may be made as to whether one or more actions (e.g., item pick, item place) were performed by the agent during the sub-session while the agent was in the event area, as 622. Any of a variety of techniques may be used to detect item actions performed by an agent while in an event area. For example, image processing of an inventory shelf and/or items in the hand of an agent may be performed to detect actions performed with respect to items within the event area. As another example, one or more sensors (e.g., load cells, pressure sensor, weight sensor) at an inventory location may detect a pick or a place of an item to/from an inventory location and such data may be used to determine a corresponding action performed by the agent.

If it is determined that the agent performed one or more actions while located in the event area, the actions and corresponding items determined to have been performed by the agent while in the event area, the feature embedding determined for the agent while the agent was in the event area, the time duration or time-stamps indicating the time period while the agent was in the event area, the event area position within the materials handling facility, etc., may be associated to generate a sub-session tracklet for the agent while in the event area, as in 624. As discussed above, the sub-session tracklet may be maintained in an unlinked sub-session tracklet list for the materials handling facility until the sub-session tracklet is re-identified and associated with an agent.

If it is determined at decision block 622 that the agent did not perform one or more actions while located in the event area, the feature embedding determined for the agent while the agent was in the event area, the time duration or time-stamps indicating the time period while the agent was in the event area, the event area position within the materials handling facility, etc., may be associated to generate a sub-session tracklet for the agent while in the event area, as in 626. As discussed above, the sub-session tracklet may be maintained in an unlinked sub-session tracklet list for the materials handling facility until the sub-session tracklet is re-identified and associated with an agent.

After generating the sub-session tracklet at either block 624 or block 626, the example process 600 returns to decision block 602 and continues.

Figure 7:
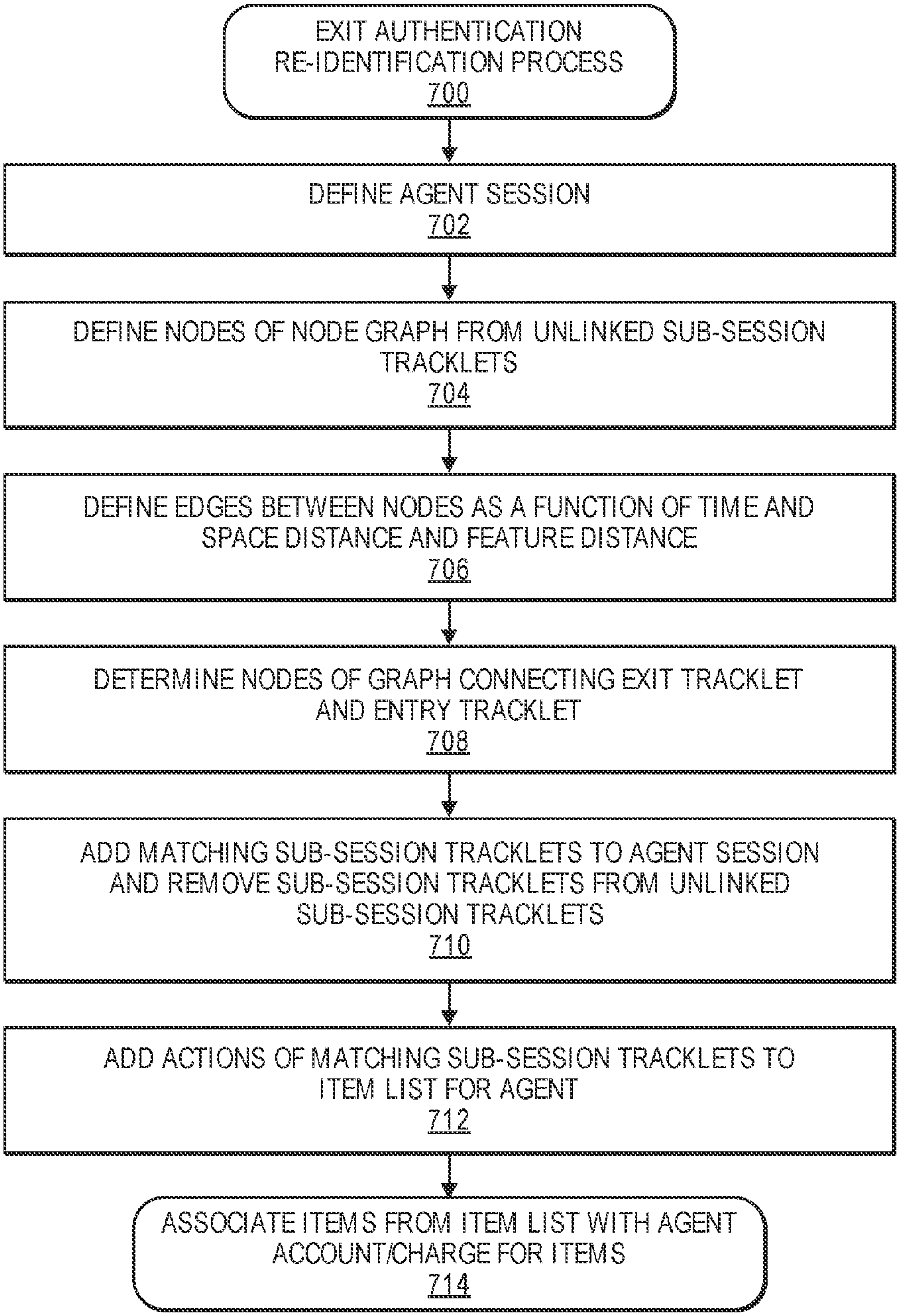
FIG. 7 illustrates an example exit authentication re-identification process, in accordance with implementations of the present disclosure.

FIG. 7 illustrates an example exit authentication re-identification process 700, in accordance with implementations of the present disclosure. The example process 700 may be performed when it is determined in example process 600 that an agent has been detected in an exit event area of a materials handling facility.

The example process 700 begins by defining an agent session for the agent represented by the exit tracklet, as in 702. The agent session may include an exit time, determined from the exit time indicated by the exit tracklet generated while the agent was in the exit event area.

Likewise, nodes of a node graph may be defined from unlinked sub-session tracklets 704. Unlinked sub-session tracklets correspond to detected agents at different event areas within the materials handling facility that have not been associated with an agent. In some implementations, the unlinked sub-session tracklets may be refined or reduced based on the location of the event area within the materials handling facility, the timeframe of the sub-session tracklet and the exit time determined for the agent. For example, the materials handling facility may be divided into quadrants and/or event areas may be designated by position and a minimum time duration may be defined between quadrants and/or event areas indicating a minimum time required for an agent to travel from one quadrant/event area to another quadrant/event area. For example, if it is determined that it takes a minimum of thirty seconds for an agent to travel from the exit event area to a second event area within the materials handling facility, any sub-session tracklets generated for that second event area during the thirty seconds prior to the agent entering the exit event area may be excluded from the unlinked sub-session tracklets.

Edges between nodes of the node graph may also be defined based on, for example, a function of time and spatial distance between nodes and/or based on feature embedding distance between nodes, as in 706. In some implementations, edges may only go forward in time between nodes and each node may have only one entry edge and one exiting edge. Likewise, edges may have weights applied with higher weights corresponding to nodes that are closer in time and spatial distance and/or closer in feature distance than nodes that are farther apart in time and spatial distance and/or farther apart in feature distance. In some implementations, if the distance (time/spatial and/or feature) is above a threshold, an edge may not be generated.

For example, an edge connecting a first node corresponding to a sub-session tracklet generated for a first event area and a second node corresponding to a second sub-session tracklet generated for a second event area may be given a higher weight than other edges if the first event area and the second event area are close to each other and the time corresponds to a time that is expected for an agent to move between the first event area and the second event area. In comparison, an edge connecting a third node corresponding to a third sub-session tracklet generated for a third event area and a fourth node corresponding to a fourth sub-session tracklet generated for a fourth event area may be given a lower weight than other edges if the third event area and the fourth event area are spatially far apart from each other and the time does correspond to a time that is expected for an agent to move between the third event area and the fourth event area.

Based on the nodes and edges of the node graph, a series of nodes are determined for the agent that connect the exit node of the exit tracklet back to an entry node, as in 708. In some implementations, if the materials handling facility does not include an entry event area, the exit node may be connected to one or more nodes of other event areas and/or determined to not be connected to any other nodes (i.e., the agent passed through the materials handling facility to the exit event area without passing through other event areas). Determining nodes of the node graph may be done by traversing edges between nodes having the highest weights to identify nodes corresponding to the agent.

The sub-session tracklet(s) corresponding to the nodes determined for the agent may then be re-identified as corresponding to the agent, added to the agent session, and removed from the unlinked sub-session tracklet list so the matching sub-session tracklets are not considered for re-identification with other agents, as in 710. Additionally, an item list associated with the agent and/or agent session may be updated to add or remove an item identifier corresponding to an item involved in any actions indicated in the determined sub-session tracklets, as in 712. For example, if an action of an item pick of an item from an inventory location is indicated in a sub-session tracklet that corresponds to the agent, the item list may be updated to include an item identifier of the item and a quantity of items picked by the agent. If the action is an item place of an item to an inventory location, the item list associated with the agent/agent session may be updated to decrement a quantity of the item involved in the item action or to remove the item identifier corresponding to the item involved in the item place action.

After updating the item list at block 712, any items on the item list are associated with an agent account of the agent and/or the agent may be charged for the items, as in 714, and the example process 700 completes. For example, if the materials handling facility is a retail store and the agent is a customer of the store, upon completion of the example process 700, the customer may be charged a fee for any items on the item list for that customer as the customer leaves the retail facility.

Figure 8A:
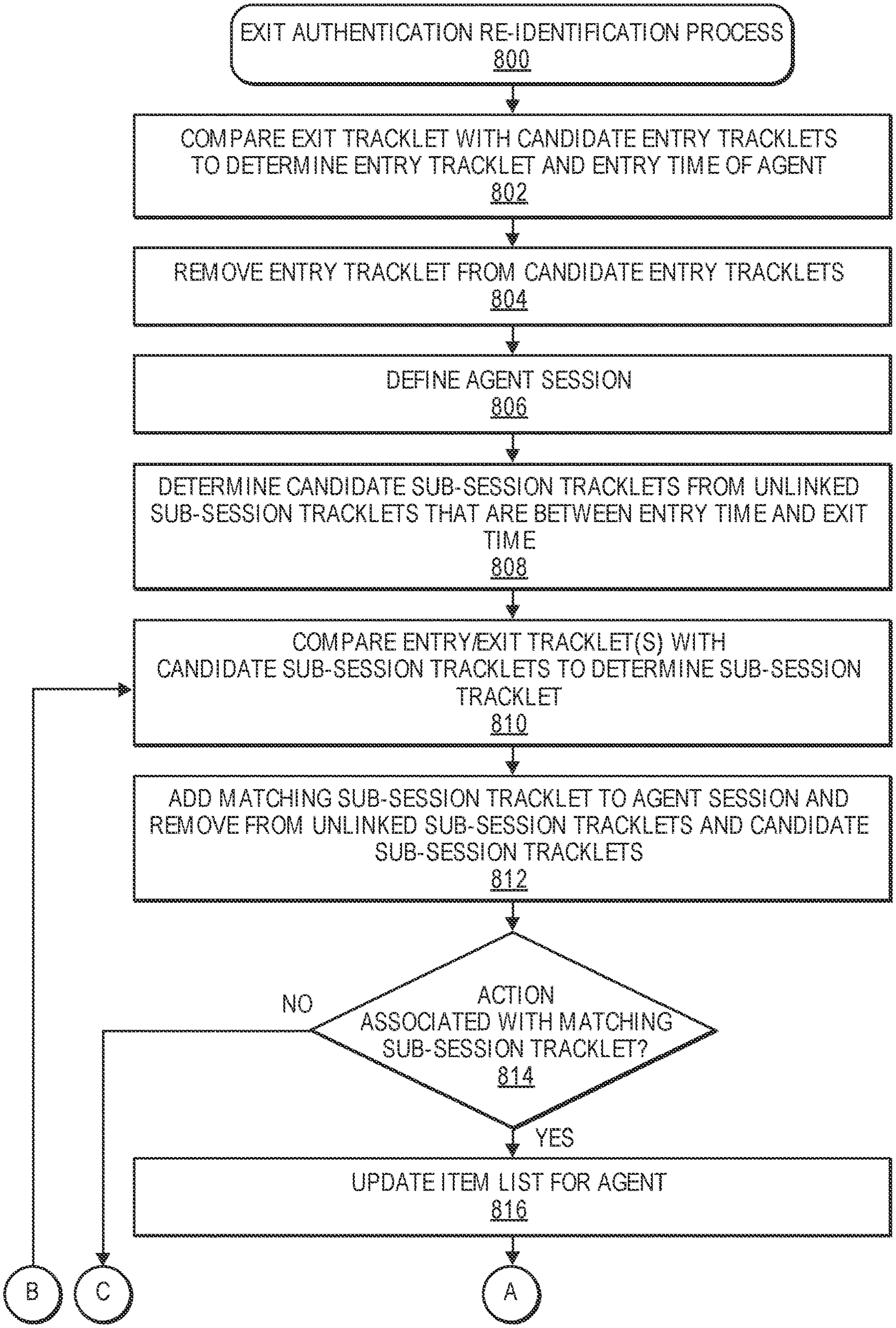
FIGS. 8A and 8B illustrate another example exit authentication re-identification process, in accordance with implementations of the present disclosure.
Figure 8B:
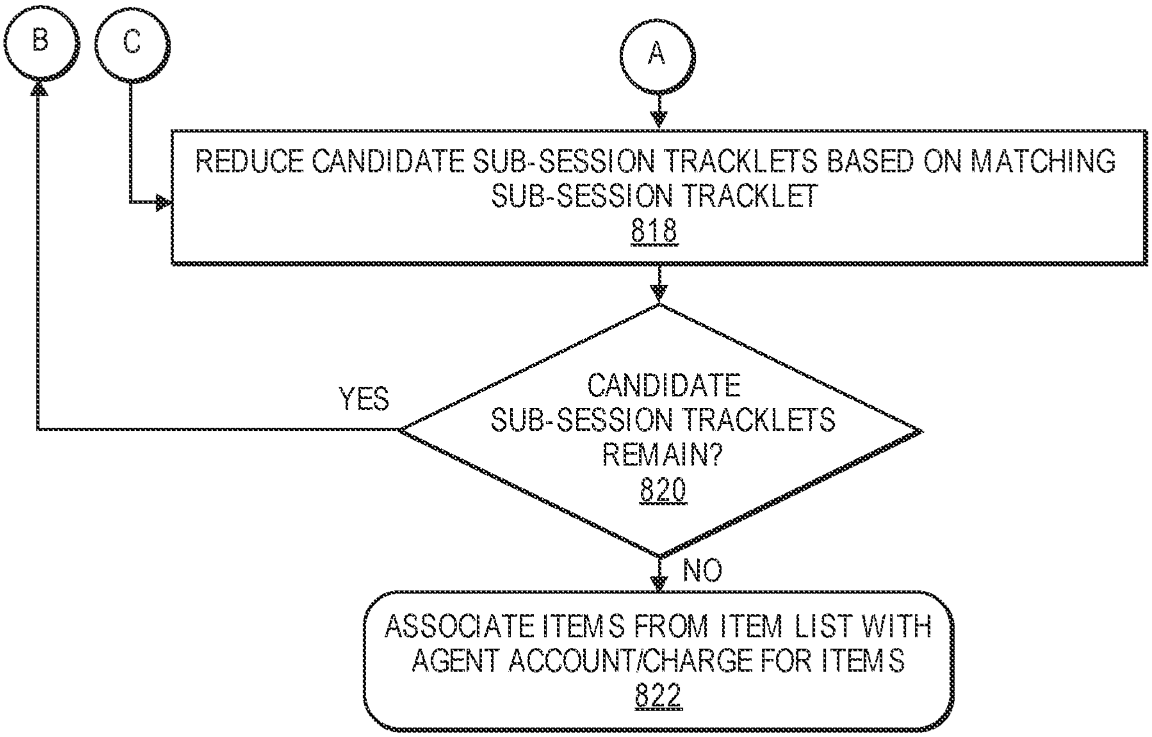

FIGS. 8A and 8B illustrate another example exit authentication re-identification process 800, in accordance with implementations of the present disclosure. The example process 800 may be performed when it is determined in example process 600 that an agent has been detected in an exit event area of a materials handling facility.

The example process 800 begins by comparing the feature embedding of the exit tracklet generated at block 614 (FIG. 6) for the agent with feature embedding of candidate entry tracklets generated for agents that have passed through the entry event area to determine an entry tracklet and corresponding entry time of the agent, as in 802. Candidate entry tracklets may include all entry tracklets generated for agents passing through the entry event area that have not been associated with an exit tracklet and removed from the set of candidate entry tracklets. Accordingly, the candidate entry tracklets represent all agents currently located within the materials handling facility.

Comparison of the exit tracklet with candidate entry tracklets may include comparing the feature embeddings, feature sets, and/or corresponding embedding vectors generated for the exit tracklet with the feature embeddings, feature sets, and/or corresponding embedding vectors generated for each of the entry tracklets to determine which entry tracklet has a highest similarity to the exit tracklet. As another example, the feature embedding of the exit tracklet me be projected into a multi-dimensional vector space along with the feature embeddings of each candidate entry tracklet and the feature embedding of the candidate entry tracklet that is closest in distance to the feature embedding vectors of the exit tracklet may be determined to correspond to the same agent. Regardless of the technique used, the exit tracklet and candidate entry tracklet determined to have the highest similarity are determined to represent the same agent and the entry time for the determined entry tracklet and the exit time for the exit tracklet are determined for the entry time and exit time of the agent. Likewise, the agent account, also referred to herein as an agent profile, determined at either/both entry or exit that is associated with the tracklet(s) may also be determined.

In some implementations, other information, such as agent identification provided at entry/exit (e.g., biometrics, badge identifier, password, etc.) may also be used to determine an exit tracklet and corresponding entry tracklet that are representative of the same agent.

In some implementations, determining of corresponding entry and exit tracklets may also be utilized with the example process 700, discussed above, to reduce the number of unlinked sub-session tracklets for which nodes are generated as part of the node graph.

Upon determination of a candidate entry tracklet that corresponds to the exit tracklet and represents the same agent, the determined entry tracklet is removed from the list of candidate entry tracklets so that the entry tracklet will not be compared with or considered when determining an entry tracklet for another exiting agent, as in 804.

An agent session may also be defined for the agent represented by the exit tracklet and determined entry tracklet, as in 806. The agent session may include an entry time, determined from the entry time indicated by the determined entry tracklet and an exit time, determined from the exit time indicated by the exit tracklet generated while the agent was in the exit event area.

Candidate sub-session tracklets from the unlinked sub-session tracklets list with timeframes between the entry time and the exit time may then be determined, as in 808. Candidate sub-session tracklets correspond to detected agents at different event areas within the materials handling facility during the timeframe (between the entry time and exit time determined for the agent) that could have been the agent and are therefore candidate sub-session tracklets. In some implementations, the candidate sub-session tracklets may be refined or reduced based on the location of the event area within the materials handling facility, the timeframe of the sub-session tracklet and either the entry time or the exit time determined for the agent. For example, the materials handling facility may be divided into quadrants and/or event areas may be designated by position and a minimum time duration may be defined between quadrants and/or event areas indicating a minimum time required for an agent to travel from one quadrant/event area to another quadrant/event area. For example, if it is determined that it takes a minimum of thirty seconds for an agent to travel from the entry event area to a second event area within the materials handling facility, any sub-session tracklets generated for that second event area during the thirty seconds following the agent leaving the entry event area may be excluded from the candidate sub-session tracklets. Likewise, if it is determined that it takes a minimum of fifteen seconds for an agent to travel between the exit event area and a third event area within the materials handling facility, any unlinked sub-session tracklets generated for the third event area that occurred during the fifteen seconds before the agent entered the exit event area may be excluded from the candidate sub-session tracklets.

The feature embeddings, feature sets, and/or embedding vectors of either or both of the determined entry tracklet and the exit tracklet may then be compared with the feature embedding, feature sets, and/or embedding vectors of candidate sub-session tracklets to determine a candidate sub-session tracklet that corresponds to the agent, as in 810. Similar to comparing the entry tracklet, comparison of the exit tracklet and/or entry tracklet with candidate sub-session tracklets may include comparing the feature embedding, feature set, and/or corresponding embedding vectors generated for the exit tracklet and/or the entry tracklet with the feature embedding, feature sets, and/or corresponding embedding vectors generated for each of the candidate sub-session tracklets to determine which candidate sub-session tracklet has a highest similarity to the exit tracklet and/or the entry tracklet. As another example, the feature embedding and/or the embedding vectors of the exit tracklet and/or the entry tracklet may be projected into a multi-dimensional vector space along with the embedding vectors of each candidate sub-session tracklet and the feature embedding and/or embedding vectors of the candidate sub-session tracklets that are closest in distance to the embedding vectors of the exit tracklet and/or the entry tracklet may be determined to correspond to the same agent. Regardless of the technique used, the candidate sub-session tracklet(s) determined to have a highest similarity/closest distance to the exit tracklet and/or entry tracklet may be determined to represent the same agent as the entry tracklet/exit tracklet.

It will be appreciated that more than one sub-session tracklet may be determined to correspond to the exit tracklet and/or entry tracklet. For example, if the feature embeddings of sub-session tracklets and the entry tracklet/exit tracklet are projected into a multidimensional space, all sub-session tracklets with feature embeddings within a defined distance of the feature embedding of the entry tracklet and/or exit tracklet may be determined to represent the same agent as the entry tracklet/exit tracklet.

The matching sub-session tracklet(s) may then be re-identified as corresponding to the agent, added to the agent session, and removed from the unlinked sub-session tracklet list so the sub-session tracklet is not considered for re-identification with other agents, as in 812. A determination may also be made as to whether there is an action associated with the matching sub-session tracklet, as in 814. If it is determined that there is a matching action, an item list associated with the agent and/or agent session may be updated to add or remove an item identifier corresponding to an item involved in the action, as in 816. For example, if the action is an item pick of an item from an inventory location, the item list may be updated to include an item identifier of the item and a quantity of items picked by the agent. If the action is an item place of an item to an inventory location, the item list associated with the agent/agent session may be updated to decrement a quantity of the item involved in the item action or to remove the item identifier corresponding to the item involved in the item place action.

After updating the item list at block 816 or if it is determined at decision block 814 that an item action was not associated with the matching sub-session tracklet, the candidate sub-session tracklets may be reduced based on the determined matching sub-session tracklet, as in 818. For example, the materials handling facility may be divided into quadrants and/or event areas may be designated by position and a minimum time duration may be defined between quadrants and/or event areas indicating a minimum time required for an agent to travel from one quadrant/event area to another quadrant/event area. For example, if it is determined that it takes a minimum of thirty seconds for an agent to travel from a first event area at which the matching sub-session tracklet was generated to a second event area within the materials handling facility, any sub-session tracklets generated for that second event area during the thirty seconds following the agent leaving the first event area, as determined from the matching sub-session tracklet, may be excluded from the candidate sub-session tracklets. Likewise, if it is determined that it takes a minimum of fifteen seconds for an agent to travel between the first event area and a third event area within the materials handling facility, any unlinked sub-session tracklets generated for the third event area that occurred during the fifteen seconds after the agent exited the first event area may be excluded from the candidate sub-session tracklets.

After reducing the list of candidate sub-session tracklets, a determination may be made as to whether any candidate sub-session tracklets remain, as in 820. If it is determined that one or more candidate sub-session tracklets remain, the example process 800 returns to block 810 and continues. If it is determined that no candidate sub-session tracklets remain, any items on the item list are associated with an agent account of the agent and/or the agent may be charged for the items, as in 822, and the example process 800 completes. For example, if the materials handling facility is a retail store and the agent is a customer of the store, upon completion of the example process 800, the customer may be charged a fee for any items on the item list for that customer as the customer leaves the retail facility.

Figure 9A:
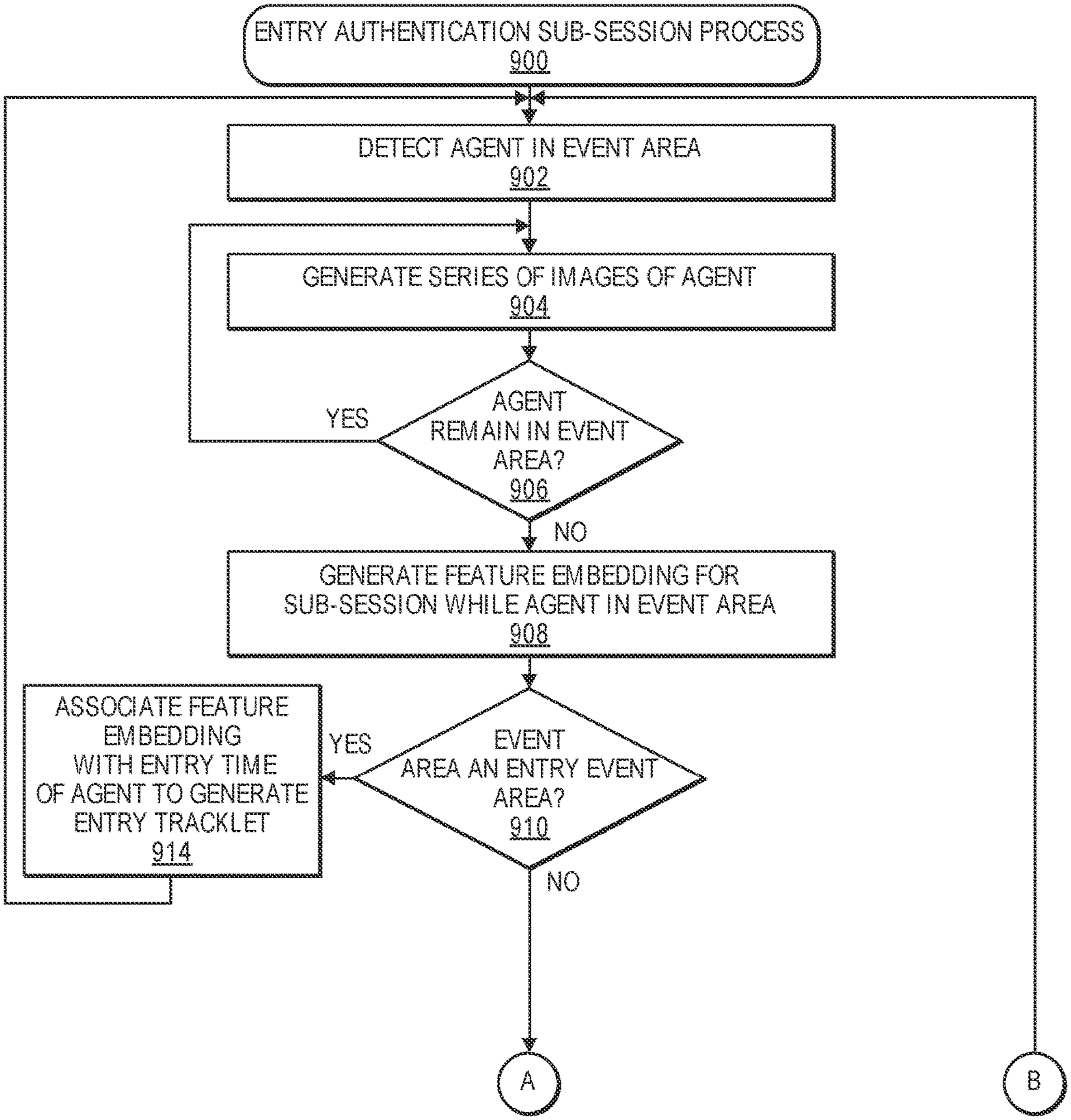
FIGS. 9A and 9B illustrate an example entry authentication sub-session process, in accordance with implementations of the present disclosure.
Figure 9B:
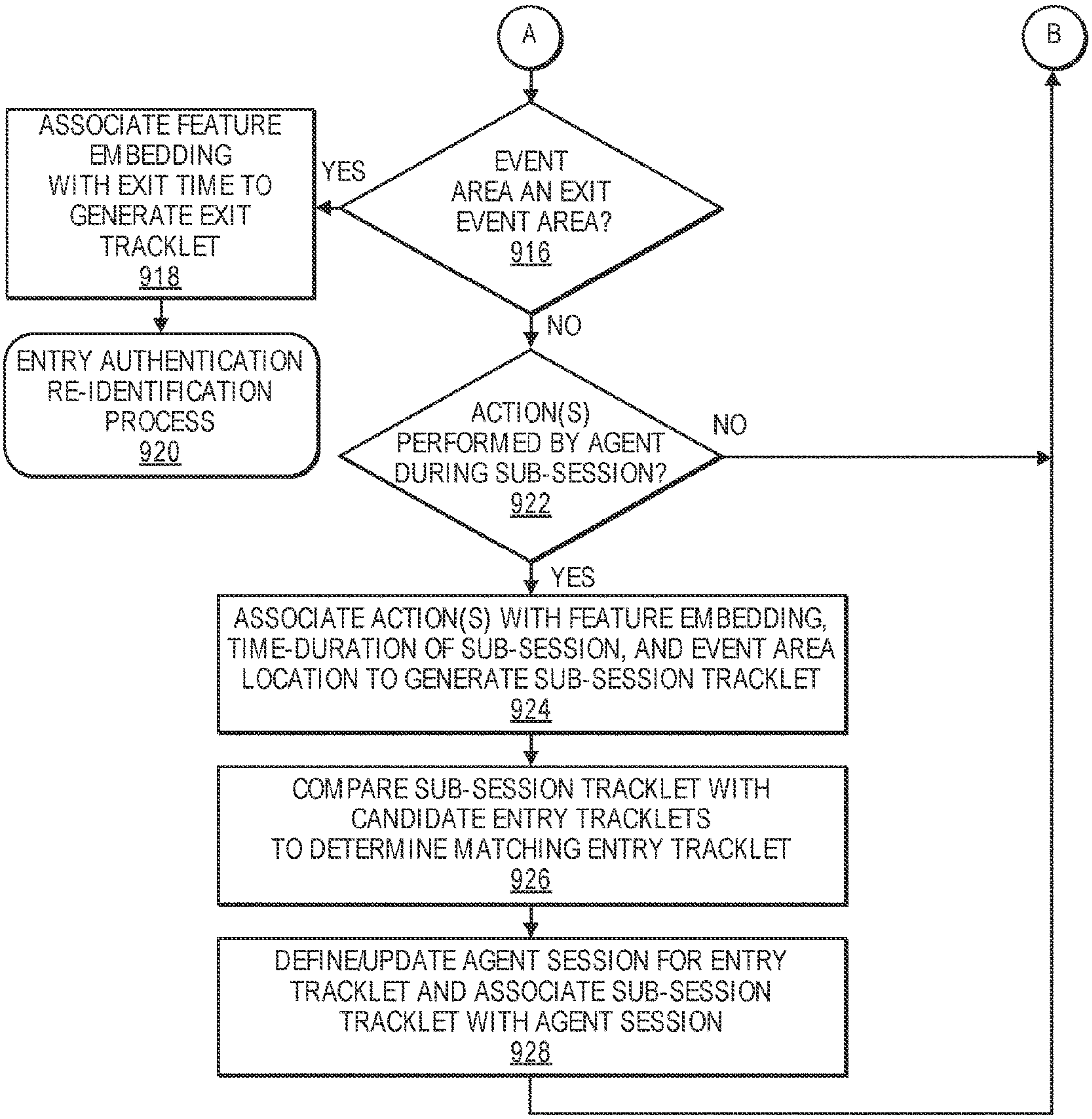

FIGS. 9A and 9B illustrate an example entry authentication sub-session process 900, in accordance with implementations of the present disclosure. Some or all of the example process 900 may be performed independently for each event area within a materials handling facility and/or some or all of the example process may be performed for all or a sub-set of all event areas of a materials handling facility.

The example process 900 begins upon detecting an agent entering an event area, as in 902. For example, as image data from an imaging element (e.g., camera) of an event area is processed, a representation of the agent may be detected in the image data. As the agent is within the field of view of one or more cameras of the event area, images (e.g., still images and/or video) of the agent are generated, as in 904. As images are generated, a determination may be made as to whether the agent remains in the event area, as in 906. For example, as images are generated, the images may be initially processed to determine if a representation of the agent remains in one or more images. If the agent is determined to still be in the event area, the example process 900 returns to block 904 and continues generating images of the agent. If it is determined that the agent has left the event area, a feature embedding indicative of a feature set that includes one or more embedding vectors representative of the agent is generated for a sub-session tracklet of the agent that is representative of the agent while the agent was in the event area, as in 908. Generation of a tracklet and feature embedding for a sub-session while the agent is within the event area is discussed above. The sub-session tracklet may include, for the feature embedding, a time duration or timestamps indicating when the agent was positioned within the event area, the location of the event area within the materials handling facility, an indication of any actions (e.g., item pick, item place) or any items performed by the agent while the agent was located in the event area, etc.

A determination may then be made as to whether the event area is an entry event area, as in 910. An entry event area may be a designated event area within a materials handling facility, such as an entry location into a materials handling facility or an entry location into a specific portion of a materials handling facility. For example, some materials handling facilities may include different areas with, for example, different levels of authorized access. In such a configuration, the different areas may each have designated entry and exit event areas.

If it is determined that the event area is an entry event area, the feature embedding generated while the agent was in the event area may be associated with an entry time and/or a time duration at which the agent was in the entry event area to generate an entry tracklet for the agent while the agent was positioned within the entry event area, as in 914. In some implementations, as part of entry, the agent may also provide identification, such as biometrics, password, keycard identifier, etc., that is known to the system and can be used to associate the entry tracklet with an agent account maintained by the system. After generating the entry tracklet, the example process returns to block 902 and continues.

If it is determined at decision block 910 that the event area is not an entry event area, a determination may be made as to whether the event area is an exit event area, as in 916. In comparison to an entry event area, an exit event area may be a designated event area within a materials handling facility, such as an exit location out of a materials handling facility or an exit location out of a specific portion of a materials handling facility. For example, some materials handling facilities may include different areas with, for example, different levels of authorized access. In such a configuration, the different areas may each have designated entry and exit event areas.

If it is determined that the event area is an exit event area, the feature embedding generated while the agent was in the event area may be associated with an exit time and/or a time duration at which the agent was in the exit event area to generate an exit tracklet for the agent while the agent was positioned within the exit event area, as in 918. In some implementations, as part of exit, the agent may also provide identification, such as biometrics, password, keycard identifier, etc., that is known to the system and can be used to associate the exit tracklet with an agent account maintained by the system. After generating the exit tracklet, the example process 900 may complete with performance of the entry authentication re-identification process discussed below with respect to FIG. 10, as in 920.

If it is determined at decision block 916 that the event area is not an exit event area, a determination may be made as to whether one or more actions (e.g., item pick, item place) were performed by the agent during the sub-session while the agent was in the event area, as 922. Any of a variety of techniques may be used to detect item actions performed by an agent while in an event area. For example, image processing of an inventory shelf and/or items in the hand of an agent may be performed to detect actions performed with respect to items within the event area. As another example, one or more sensors (e.g., load cells, pressure sensor, weight sensor) at an inventory location may detect a pick or a place of an item to/from an inventory location and such data may be used to determine a corresponding action performed by the agent.

If it is determined that the agent performed one or more actions while located in the event area, the actions and corresponding items determined to have been performed by the agent while in the event area, the feature embedding determined for the agent while the agent was in the event area, the time duration or time-stamps indicating the time period while the agent was in the event area, the event area position within the materials handling facility, etc., may be associated to generate a sub-session tracklet for the agent while in the event area, as in 924.

If it is determined at decision block 922 that the agent did not perform one or more actions while located in the event area, the example process may discard the feature embedding generated for the agent while in the event area, return to block 902, and continue. In other implementations, rather than discarding the feature embedding and/or feature set of feature embedding determined for the agent while the agent was in the event area, the time duration or time-stamps indicating the time period while the agent was in the event area, the event area position within the materials handling facility, etc., may be associated to generate a sub-session tracklet for the agent while in the event area. In such an example, rather than returning to decision block 902, the example process 900 may continue to block 924 and generate a sub-session tracklet for the agent while in the event area, without any actions associated therewith, and continue.

After generating the sub-session tracklet at block 924 the sub-session tracklet may be compared with candidate entry tracklets to determine a matching candidate entry tracklet, as in 926. Candidate entry tracklets may include all entry tracklets generated for agents passing through the entry event area that have not been associated with an exit tracklet and removed from the set of candidate entry tracklets. Accordingly, the candidate entry tracklets represent all agents currently located within the materials handling facility.

Comparison of the sub-session tracklet with candidate entry tracklets may include comparing the feature embedding, feature set, and/or corresponding embedding vectors generated for the sub-session tracklet with the feature embeddings, feature sets, and/or corresponding embedding vectors generated for each of the candidate entry tracklets to determine which candidate entry tracklet has a highest similarity to the sub-session tracklet. As another example, the feature embedding may be projected into a multi-dimensional vector space along with the feature embeddings of each candidate entry tracklet and the feature embedding of the candidate entry tracklets that is closest in distance to the feature embedding of the sub-session tracklet may be determined to correspond to the same agent. Regardless of the technique used, the sub-session tracklet and candidate entry tracklet determined to have the highest similarity are determined to represent the same agent.

Upon determination of a matching candidate entry tracklet, an agent session for the agent represented by the matching entry tracklet and sub-session tracklet is generated to include both the matching entry tracklet and the sub-session tracklet and associated with the matching entry tracklet, as in 928. If the matching entry tracklet already has an associated agent session, the sub-session tracklet may be associated with the agent session associated with the matching entry tracklet. After associating the sub-session tracklet with agent session for the matching entry tracklet, the example process 900 returns to block 902 and continues.

Figure 10:
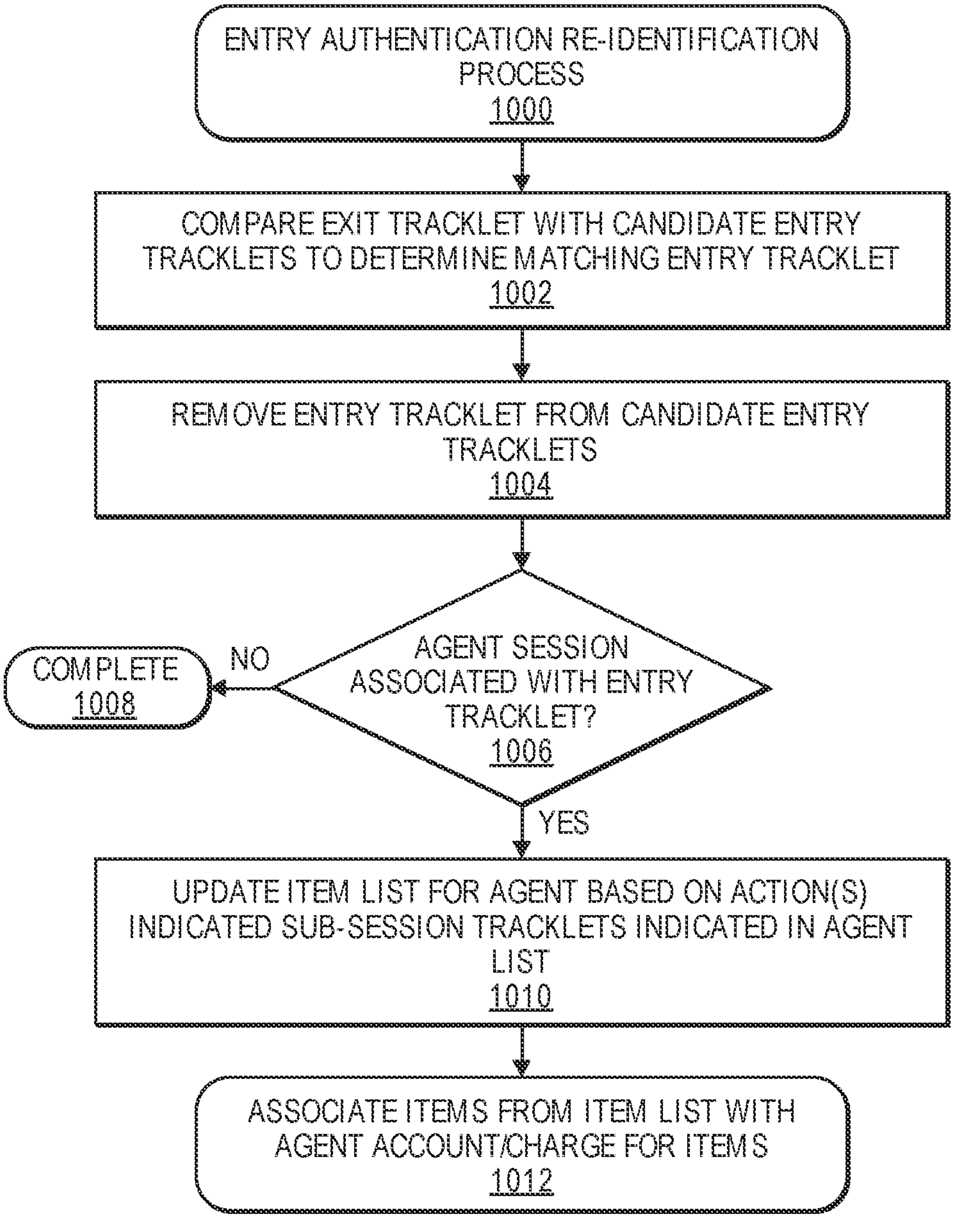
FIG. 10 is an example entry authentication re-identification process, in accordance with implementations of the present disclosure.

FIG. 10 illustrates an example entry authentication re-identification process 1000, in accordance with implementations of the present disclosure. The example process 1000 may be performed when it is determined in example process 900 that an agent has been detected in an exit event area of a materials handling facility.

The example process 1000 begins by comparing the feature embedding of the exit tracklet generated at block 914 (FIG. 9) for the agent with feature embeddings of candidate entry tracklets generated for agents that have passed through the entry event area, and optionally to some or all sub-session tracklets indicated in an agent session associated with each of the candidate entry tracklets to determine an entry tracklet corresponding to the agent, as in 1002. Candidate entry tracklets may include all entry tracklets generated for agents passing through the entry event area that have not been associated with an exit tracklet and removed from the set of candidate entry tracklets. Accordingly, the candidate entry tracklets represent all agents currently located within the materials handling facility.

In some implementations, the candidate entry tracklets may be reduced such that only those candidate entry tracklets that could possibly correspond to the exit tracklet and the agent are considered. For example, if it is known that it takes a minimum of one minute for an agent to move between the entry event area to the exit event area, any entry tracklets generated less than one minute before the agent entered the exit event area may be excluded from the candidate entry tracklets as that entry tracklet could not have been generated by the same agent that generated the exit tracklet. As another example, if it is known that it takes thirty seconds for an agent to move between a first event area and the exit event area, any entry tracklet that includes an account session and an associated sub-session tracklet generated in the first event area less than thirty seconds before the exit tracklet was generated may be removed from the candidate entry tracklets as the agent that generated the exit tracklet could not have also generated the associated sub-session tracklet, which is also determined to correspond to the entry tracklet.

Comparison of the exit tracklet with candidate entry tracklets may include comparing the feature embedding, feature set, and/or corresponding embedding vectors generated for the exit tracklet with the feature embedding, feature sets, and/or corresponding embedding vectors generated for each of the entry tracklets to determine which entry tracklet has a highest similarity to the exit tracklet. As another example, the feature embedding of the exit tracklet me be projected into a multi-dimensional vector space along with the feature embeddings of each candidate entry tracklet and the feature embedding of the candidate entry tracklet that is closest in distance to the feature embedding of the exit tracklet may be determined to correspond to the same agent. As noted above, in some examples, the feature embedding, feature set, and/or embedding vectors of the exit tracklet may also be compared with some or all of the sub-session tracklets associated with agent sessions of the entry tracklets. For example, if multiple candidate entry tracklets potentially correspond to the exit tracklet, additional comparison of the exit tracklet with the sub-session tracklets corresponding to each of the highest similarity candidate entry tracklets may be performed to increase a confidence as to which entry tracklet represents the same agent as the exit tracklet. Regardless of the technique(s) used, the exit tracklet and candidate entry tracklet determined to have the highest similarity are determined to represent the same agent. Likewise, the agent account determined at either/both entry or exit that is associated with the tracklet(s) may also be determined.

In some implementations, other information, such as agent identification provided at entry/exit (e.g., biometrics, badge identifier, password, etc.) may also be used to determine an exit tracklet and corresponding entry tracklet that are representative of the same agent.

Upon determination of a candidate entry tracklet that corresponds to the exit tracklet and represents the same agent, the determined entry tracklet is removed from the list of candidate entry tracklets so that the entry tracklet will not be compared with or considered when determining an entry tracklet for another exiting agent and/or for matching sub-session tracklets, as in 1004.

A determination may then be made as to whether an agent session is associated with the matching entry tracklet, as in 1006. In some implementations, an agent session may be generated any time an agent enters a facility. In other implementations, an agent session may only be generated when an agent enters a materials handling facility through the entry event area and enters another event area before entering the exit event area. In still other examples, an agent session may only be generated for an entry tracklet when an agent enters the materials handling facility through the entry event area, enters another event area, and performs an action within that event area before the agent enters the exit event area.

If it is determined that an agent session is not associated with the matching entry tracklet, the example process 1000 completes, as in 1008. If it is determined that an agent session is associated with the matching entry tracklet, an item list associated with the agent may be updated to include items involved in one or more actions associated with one or more sub-session tracklets indicated in the event session, as in 1010. For example, if an action of an item pick of an item from an inventory location is associated with one of the sub-session tracklets indicted in the agent session, the item list may be updated to include an item identifier for the item and a quantity of items picked by the agent. If an action of an item place of an item to an inventory location is associated with a sub-session tracklet indicated in the agent session, the item list associated with the agent/agent session may be updated to decrement a quantity of the item involved in the item action or to remove the item identifier corresponding to the item involved in the item place action.

After updating the item list for all actions associated with sub-session tracklets indicated in the agent session, any items on the item list are associated with an agent account of the agent and/or the agent may be charged for the items, as in 1012, and the example process 1000 completes. For example, if the materials handling facility is a retail store and the agent is a customer of the store, upon completion of the example process 1000, the customer may be charged a fee for any items on the item list for that customer as the customer leaves the retail facility.

Figure 11:
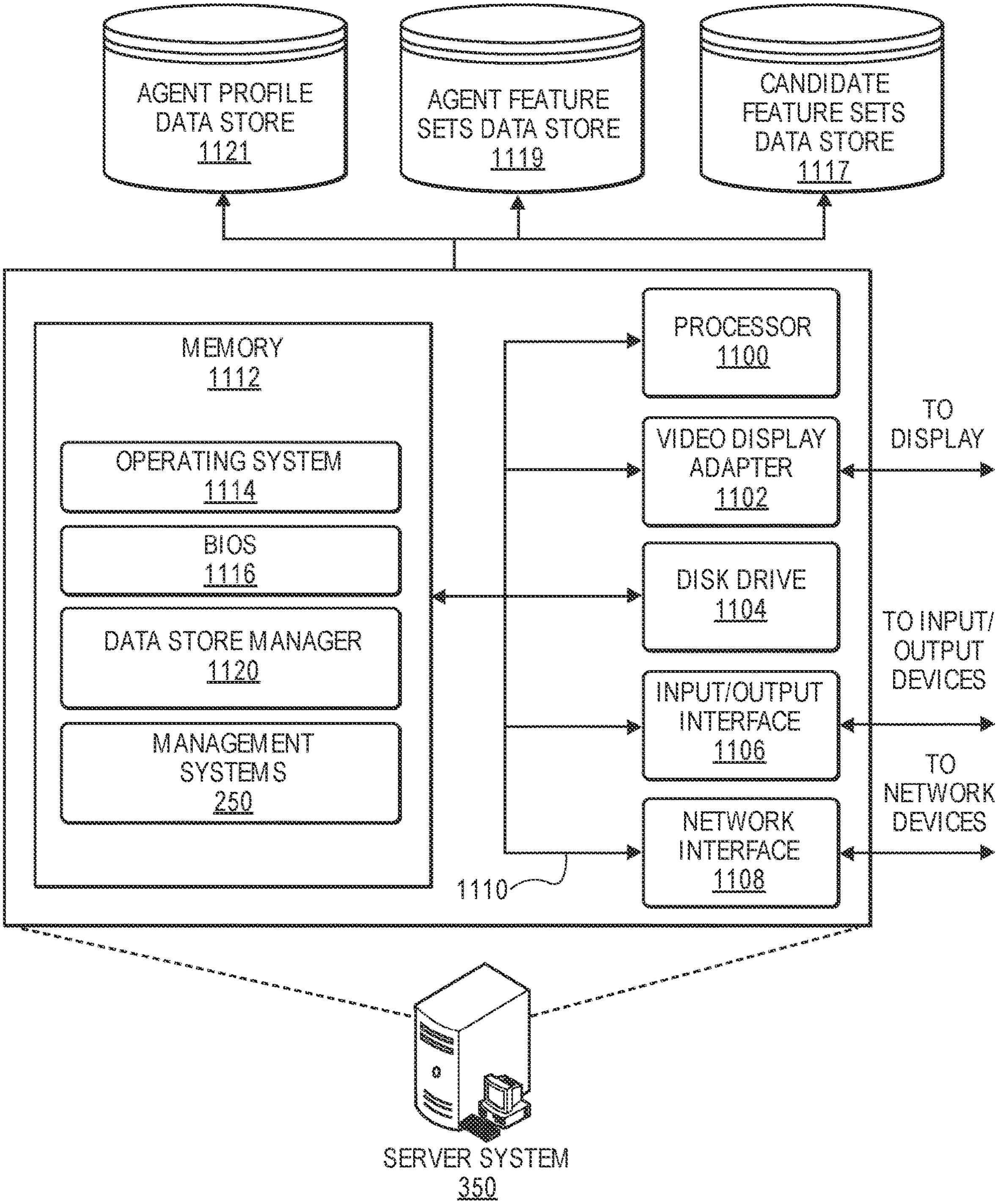
FIG. 11 is a block diagram of an illustrative implementation of a server system that may be used with various implementations.

FIG. 11 is a pictorial diagram of an illustrative implementation of a server system, such as the server system 350, that may be used in the implementations described herein.

The server system 350 may include a processor 1100, such as one or more redundant processors, a video display adapter 1102, a disk drive 1104, an input/output interface 1106, a network interface 1108, and a memory 1112. The processor 1100, the video display adapter 1102, the disk drive 1104, the input/output interface 1106, the network interface 1108, and the memory 1112 may be communicatively coupled to each other by a communication bus 1110.

The video display adapter 1102 provides display signals to a local display permitting an operator of the server system 350 to monitor and configure operation of the server system 350. The input/output interface 1106 likewise communicates with external input/output devices, such as a mouse, keyboard, scanner, or other input and output devices that can be operated by an operator of the server system 350. The network interface 1108 includes hardware, software, or any combination thereof, to communicate with other computing devices. For example, the network interface 1108 may be configured to provide communications between the server system 350 and other computing devices via the network 402, as shown in FIG. 4.

The memory 1112 may be a non-transitory computer readable storage medium configured to store executable instructions accessible by the processor(s) 1100. In various implementations, the non-transitory computer readable storage medium may be implemented using any suitable memory technology, such as static random access memory (SRAM), synchronous dynamic RAM (SDRAM), nonvolatile/Flash-type memory, or any other type of volatile or permanent memory. In the illustrated implementation, program instructions and data implementing desired functions, such as those described herein, are shown stored within the non-transitory computer readable storage medium. In other implementations, program instructions may be received, sent, or stored upon different types of computer-accessible media, such as non-transitory media, or on similar media separate from the non-transitory computer readable storage medium. Generally speaking, a non-transitory, computer readable storage medium may include storage media or memory media such as magnetic or optical media, e.g., disk or CD/DVD-ROM. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1108.

The memory 1112 is shown storing an operating system 1114 for controlling the operation of the server system 350. A binary input/output system (BIOS) 1116 for controlling the low-level operation of the server system 350 is also stored in the memory 1112. The memory 1112 additionally stores computer executable instructions, that, when executed by the processor 1100 cause the processor to perform one or more of the processes discussed herein. The memory 1112 additionally stores program code and data for providing network services. The data store manager application 1120 facilitates data exchange between the data stores 1117, 1119, 1121 and/or other data stores.

As used herein, the term "data store" refers to any device or combination of devices capable of storing, accessing and retrieving data which may include any combination and number of data servers, databases, data storage devices and data storage media in any standard, distributed or clustered environment. The server system 350 can include any appropriate hardware and software for integrating with the data stores 1117, 1119, 1121 as needed to execute aspects of the management systems 350.

The data stores 1117, 1119, 1121 can include several separate data tables, databases or other data storage mechanisms and media for storing data relating to a particular aspect. For example, the data stores 1117, 1119, 1121 illustrated include mechanisms for maintaining agent profiles/agent accounts and features sets that include embedding vectors representative of agents, etc. Depending on the configuration and use of the server system 350, one or more of the data stores may not be included or accessible to the server system 350 and/or other data store may be included or accessible.

It should be understood that there can be many other aspects that may be stored in the data stores 1117, 1119, 1121. The data stores 1117, 1119, 1121 are operable, through logic associated therewith, to receive instructions from the server system 350 and obtain, update or otherwise process data in response thereto.

The memory 1112 may also include the inventory management system, and/or the re-identification system. The corresponding server system 350 may be executable by the processor 1100 to implement one or more of the functions of the server system 350. In one implementation, the server system 350 may represent instructions embodied in one or more software programs stored in the memory 1112. In another implementation, the system 350 can represent hardware, software instructions, or a combination thereof.

The server system 350, in one implementation, is a distributed environment utilizing several computer systems and components that are interconnected via communication links, using one or more computer networks or direct connections. It will be appreciated by those of ordinary skill in the art that such a system could operate equally well in a system having fewer or a greater number of components than are illustrated in FIG. 11. Thus, the depiction in FIG. 11 should be taken as being illustrative in nature and not limiting to the scope of the disclosure.

Although some of the implementations disclosed herein reference the association of human agents with respect to locations of events or items associated with such events, the systems and methods of the present disclosure are not so limited. For example, the systems and methods disclosed herein may be used to associate any non-human animals, as well as any number of machines or robots, with events or items of one or more types. The systems and methods disclosed herein are not limited to recognizing and detecting humans, or re-identification of humans.

Additionally, although some of the implementations described herein or shown in the accompanying figures refer to the processing of imaging data that is in color, e.g., according to an RGB color model, the systems and methods disclosed herein are not so limited, and may be used to process any type of information or data that is provided in color according to any color model, or in black-and-white or grayscale.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims.

Moreover, with respect to the one or more methods or processes of the present disclosure shown or described herein, including but not limited to the flow charts shown in FIGS. 6A through 10, order in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
- detecting a first agent in a first event area of a plurality of event areas within a materials handling facility, wherein:
  - the materials handling facility includes the plurality of event areas and at least one untracked area that separates each of the plurality of event areas; and
  - each event area of the plurality of event areas includes one or more cameras;
- generating, based at least in part on first image data from at least a first camera of the first event area, a first sub-session tracklet indicative of the first agent while the first agent is in the first event area;
- including the first sub-session tracklet in an unlinked sub-session tracklet list that indicates a plurality of tracklets indicative of agents detected within the materials handling facility;
- detecting a second agent in a second event area of the plurality of event areas within the materials handling facility;
- generating, based at least in part on second image data from at least a second camera of the second event area, a second sub-session tracklet indicative of the second agent while the second agent is in the second event area;
- including the second sub-session tracklet in the unlinked sub-session tracklet list;
- detecting a third agent in a third event area of the materials handling facility that corresponds to an exit of the materials handling facility;
- generating, based at least in part on third image data from at least a third camera of the third event area, an exit tracklet indicative of the third agent while the third agent is in the third event area;
- defining a plurality of nodes of a node graph based at least in part on the first sub-session tracklet, the second sub-session tracklet, and the exit tracklet;
- determining, based at least in part on the nodes of the node graph, an edge of the node graph linking a first node representative of the first sub-session tracklet and a second node representative of the exit tracklet; and
- associating the first sub-session tracklet and the exit tracklet with a first agent session of the first agent.

2. The computer-implemented method of claim 1, further comprising:
- determining, based at least in part on the nodes of the node graph, that a second edge does not exist between a third node representative of the second sub-session tracklet and the second node and that the second sub-session tracklet does not correspond to the first agent.

3. The computer-implemented method of claim 1, further comprising:
- determining that an action of an item pick of an item is associated with the first sub-session tracklet;
- updating an agent account of the first agent to include an item identifier of the item; and
- charging the first agent a fee for the item.

4. The computer-implemented method of claim 1, further comprising:
- comparing the exit tracklet with each of a plurality of entry tracklets to determine an entry tracklet of the plurality of entry tracklets that corresponds to the first agent, each of the plurality of entry tracklets indicative of an agent while the agent is within an entry event area of the materials handling facility;
- determining, based at least in part on the entry tracklet, an entry time during which the first agent was in the entry event area of the materials handling facility;
- determining, based at least in part on the exit tracklet, an exit time at which the first agent was within the third event area of the materials handling facility; and
- defining the plurality of nodes of the node graph as nodes of unlinked sub-session tracklets corresponding to a period of time between the entry time and the exit time.

5. A system, comprising:
- one or more processors; and
- a memory storing program instructions that, when executed by the one or more processors, cause the one or more processors to at least:
  - determine that an agent at a first event area of a plurality of event areas within a materials handling facility is to be identified, wherein:
    - the materials handling facility includes the plurality of event areas and at least one untracked area that separates each of the plurality of event areas; and
    - each event area of the plurality of event areas includes one or more cameras;
  - define a node graph that includes a plurality of nodes, each node of the plurality of nodes representative of a plurality of unlinked sub-session tracklets, wherein each sub-session tracklet includes at least a feature embedding representative of the agent and generated based on one or more images of the agent generated while the agent is in an event area of the plurality of event areas;
  - define an edge between a first node of the node graph corresponding to a first sub-session tracklet of the first event area and a second node of the node graph corresponding to a second sub-session tracklet of a second event area; and
  - associate the first sub-session tracklet with the second sub-session tracklet as corresponding to the agent.

6. The system of claim 5, wherein:
- the first event area is an exit event area; and
- the program instructions that, when executed by the one or more processors, further cause the one or more processors to at least:
  - determine an entry time corresponding to the first sub-session tracklet;
  - determine an exit time corresponding to the second sub-session tracklet;
  - determine a plurality of candidate sub-session tracklets that were each generated between the entry time and the exit time, each candidate sub-session tracklet of the plurality of candidate sub-session tracklets indicative of an agent positioned within one of the plurality of event areas; and define nodes of the node graph for each of the plurality of candidate sub-session tracklets.

7. The system of claim 5, wherein the program instructions that, when executed by the one or more processors, further cause the one or more processors to at least:

determine that an action of an item pick of an item from an inventory location is associated with the second sub-session tracklet; and associate an item identifier of the item with the agent.

8. The system of claim 5, wherein the program instructions that define the edge, further include program instructions that, when executed by the one or more processors, further cause the one or more processors to at least:

define the edge based on one or more of:

a duration of time between a first time corresponding to the first node and a second time corresponding to the second node;

a spatial distance between a first position corresponding to the first node and a second position corresponding to the second node; or a feature distance between a first feature embedding corresponding to the first node and a second feature embedding corresponding to the second node.

9. The system of claim 5, wherein:

the second event area is an inventory area; and wherein the program instructions that, when executed by the one or more processors, further cause the one or more processors to at least:

determine that an item pick of an item from an inventory location within the second event area has been performed by the agent;

associate an item identifier of the item with the second sub-session tracklet; and in response to defining the edge between the first node and the second node:

generate an agent session for the agent; and associate at least one of the item identifier, the first sub-session tracklet, or the second sub-session tracklet with the agent session.

10. The system of claim 5, wherein the program instructions that, when executed by the one or more processors, further cause the one or more processors to at least:

detect the agent at the first event area;

obtain one or more images of the agent while the agent is at the first event area;

generate, based at least in part on the one or more images, a first feature representative of one or more embedding vectors indicative of the agent; and generate the first sub-session tracklet, wherein the first sub-session tracklet includes at least the first feature embedding and an indication of the first event area.

11. The system of claim 5, wherein the program instructions that, when executed by the one or more processors, further cause the one or more processors to at least:

determine an agent account corresponding to at least one of the first sub-session tracklet or the second sub-session tracklet; and associate at least one of the first sub-session tracklet, the second sub-session tracklet, or the agent with the agent account.

12. The system of claim 5, wherein the program instructions that, when executed by the one or more processors, further cause the one or more processors to at least:

remove the first sub-session tracklet and the second sub-session tracklet from the plurality of unlinked sub-session tracklets.

13. The system of claim 5, wherein the program instructions that, when executed by the one or more processors, further cause the one or more processors to at least:

determine a plurality of candidate sub-session tracklets;

define a second edge between the second node corresponding to the sub-session tracklet and a third node corresponding to a third sub-session tracklet of the plurality of candidate sub-session tracklets; and associate the third sub-session tracklet with the agent.

14. The system of claim 5, wherein the program instructions that, when executed by the one or more processors, further cause the one or more processors to at least:

reduce, based at least in part on at least one of the first sub-session tracklet or the second sub-session tracklet, a plurality of candidate sub-session tracklets to generate a reduced plurality of candidate sub-session tracklets that include less than all of the candidate sub-session tracklets; and define the plurality of nodes as corresponding to the reduced plurality of candidate sub-session tracklets.

15. The system of claim 14, wherein the program instructions that cause the one or more processors to reduce the plurality of candidate sub-session tracklets further include instructions that, when executed by the one or more processors, further cause the one or more processors to at least:

determine, based at least in part on the first sub-session tracklet, at least a third candidate sub-session tracklet of the plurality of candidate sub-session tracklets that could not correspond to the agent; and exclude the third candidate sub-session tracklet from the reduced plurality of candidate sub-session tracklets.

16. A computer-implemented method, comprising:

generating, for each of a plurality of agents located within a materials handling facility, one or more sub-session tracklets indicative of the agent while the agent is at an event area within the materials handling facility, wherein:

the materials handling facility includes a plurality of event areas and at least one untracked area that separates each of the plurality of event areas; and each event area of the plurality of event areas includes one or more cameras;

including each of the sub-session tracklets in an unlinked sub-session tracklet list;

determining an agent at an exit event area of the materials handling facility;

generating, for the agent, an exit tracklet indicative of the agent at the exit event area;

defining, based at least in part on the unlinked sub-session tracklet list, a plurality of nodes of a node graph, each node of the plurality of nodes corresponding to a sub-session tracklet indicated on the unlinked sub-session tracklet list;

defining an edge between a first node of the node graph corresponding to a first sub-session tracklet and a second node of the node graph corresponding to the exit tracklet; and associating the first sub-session tracklet with an agent session generated for the agent.

17. The computer-implemented method of claim 16, wherein defining the edge further includes:

determining the edge based at least in part on one or more of a time and spatial similarity between the exit tracklet and the first sub-session tracklet or a feature embedding similarity between a first feature embedding of the first sub-session tracklet and a second feature embedding of the exit tracklet.

18. The computer-implemented method of claim 16, wherein generating further includes:

determining at least one candidate sub-session tracklet to exclude from the plurality of sub-session tracklets based at least in part on a time associated with the first sub-session tracklet or an event area of the first sub-session tracklet.

19. The computer-implemented method of claim 16, wherein each sub-session tracklet includes, at least:

an event area indication corresponding to an event area at which the sub-session tracklet was generated;

a feature embedding indicative of the agent and generated based at least in part on a plurality of embedding vectors generated for the agent; and a time corresponding to the sub-session tracklet.

20. The computer-implemented method of claim 16, further comprising:

determining, for each node of the plurality of nodes of the node graph, one entry edge connecting the node to another node of the node graph and one exit edge connecting the node to another node of the node graph.

* * * * *